United States Patent [19]

Propst

[11] Patent Number: 5,346,359

[45] Date of Patent: Sep. 13, 1994

[54] METHOD OF ADJUSTING A WICKET GATE

[76] Inventor: Charles W. Propst, MC-63, Box 108, Moyers, W. Va. 26813

[21] Appl. No.: 946,140

[22] Filed: Sep. 17, 1992

[51] Int. Cl.⁵ .............................................. F01D 17/16
[52] U.S. Cl. ..................................... 415/1; 415/118;
  415/160; 415/163; 415/164; 29/407; 29/889.1
[58] Field of Search ................... 415/1, 118, 155, 159,
  415/160, 161, 162, 163, 164; 73/168;
  29/888.021, 889.1, 407

[56]  References Cited
  U.S. PATENT DOCUMENTS

| 1,462,483 | 9/1921 | Carpenter . |
| 3,236,498 | 7/1962 | Kerensky et al. . |
| 3,639,075 | 12/1969 | Erwin et al. . |
| 3,791,761 | 9/1972 | Hayes . |
| 4,210,408 | 10/1978 | Nace . |
| 4,787,815 | 10/1987 | Weyh . |
| 4,804,316 | 10/1987 | Fleury . |

FOREIGN PATENT DOCUMENTS 0609384 11/1960 Canada ................................. 415/163

OTHER PUBLICATIONS

Preventive Maintainance Procedure, pp. 1-7.
A Computational Approach to Wicket Gate Adjustments for Vertical Hydro Units with Elliptically Contoured Wicket Gates; C. W. Propst; 15 pgs.

Primary Examiner—Edward K. Look
Assistant Examiner—Christopher Verdier
Attorney, Agent, or Firm—Cushman, Darby & Cushman

[57]  ABSTRACT

The invention relates to a method to calculate optimum wicket gate positions based on only the initial face-to-face readings comprising the steps of measuring the initial gate openings, determining an optimum unit opening, and rotating each gate to the optimum opening. The method results in a one time adjustment that is more accurate and faster than conventional methods.

18 Claims, 10 Drawing Sheets

METHOD OF ADJUSTING A WICKET GATE

BACKGROUND OF THE INVENTION

1. Field of the Invention

The invention relates to a method for adjusting wicket gates.

2. Description of the Related Art

Wicket gates, sometimes referred to as guide vanes, are used with turbines to control flow regulation over incoming or outgoing operating fluids. A typical turbine includes a wicket gate assembly arranged in a circle around the turbine axis. This assembly includes a plurality of wicket gates and how they are adjusted, one to another, and provides the desired flow regulation to the turbine. For example, in a water turbine all gates operate in unison and equally distribute incoming water, or outgoing water, when operating as a pump to, or from, a unit runner.

Typically, the orientation of each wicket gate is adjustable around a stem axis. Each wicket gate has a wicket gate operating lever. These wicket gate operating levers are connected to a common gate operating ring via connection links for synchronous rotation of all gates during opening or closing. Eccentric pins are provided at all operating ring connection points for individual wicket gate adjustments. Such a design is disclosed in U.S. Pat. No. 4,210,408 (Nace). Other conventional means of adjusting individual wicket gates includes using a turnbuckle.

Conventional methods of adjusting the individual wicket gates include the "banding" and "trial and error" methods.

The "banding" method requires removal of all operating levers, which frees the wicket gates. Cables are draped around the wicket gate circle exterior and pulled with chain hoists or other adequate means to force all the Wicket gates closed.

The "banding" method often does not prove successful. For example, the upper and lower gate side seals may resist movement and not allow proper intermeshing actions for closing. Moreover, a sledgehammer or other large object is often used to nudge the gates which can deform the bushings and surfaces of the gates. The cables used in banding may also deform the bushings and surfaces of the gates.

In a trial and error method, adjustment is difficult, because any change on one particular gate influences adjoining gates. Many times, a small relative clearance may exist which requires several gates in an area to be adjusted, and the final readings do not always reveal the anticipated results. Moreover, the trial and error method is time consuming and often several days are required to adjust the wicket gates.

The known "banding" and "trial and error" methods often do not result in a sufficient variance among the wicket gates.

SUMMARY OF THE INVENTION

An objective of the present invention is to provide a method to improve the accuracy of adjusting wicket gates.

Another objective of the present invention is to provide a method for a one time adjustment of the wicket gates.

The above objectives are obtained by a method which uses a computer program to calculate the optimum gate positions based only on the initial face-to-face readings and to provide a systematic sequence to adjust individual gates to their optimum position.

The computer program does a simulation where one gate is held fixed and the remaining gates are sequentially rotated to a common selected opening. The final gap between the last rotated gate and the fixed gate is compared with this common opening, and the selected opening is incremented as necessary for another gyration. The iteration continues until the final gap equals the selected opening, which is the optimum opening for the fixed gate.

These steps are repeated in the simulation holding the next gate fixed and continued until optimum gate openings are known for all gates in the system or assembly. The wicket gate with the optimum gate opening nearest to the average between initial lowest and highest readings is selected as the best optimum for the unit.

The computer program stores required individual gate rotations necessary to adjust from the initial readings to final optimum locations. All gate rotations are equally increased or decreased in the simulation to equalize the values of maximum positive and negative rotation.

Eccentric pins are initially set at mid-range position. The gates are adjusted in every-other-gate sequence requiring two adjustment gyrations around the unit.

Prior to adjusting each gate, the computer program examines existing toe and heel clearances in the simulation. If insufficient clearance exists, the gate is skipped and adjustment is attempted on the next gate in the sequence. All skipped gates are adjusted after the two initial adjustment gyrations are complete and sufficient clearance is present.

Other objects, features and characteristics of the present invention, as well as the methods of operation and functions of the related elements of the structure, and the combination of the parts and economies of manufacture, will become more apparent upon consideration of the following detailed description and the appended claims with reference to the accompanying drawings, in which like reference numerals refer to the same structural elements all of which form a part of this specification.

DETAILED DESCRIPTION OF THE PREFERRED EMBODIMENTS

Figure 1:
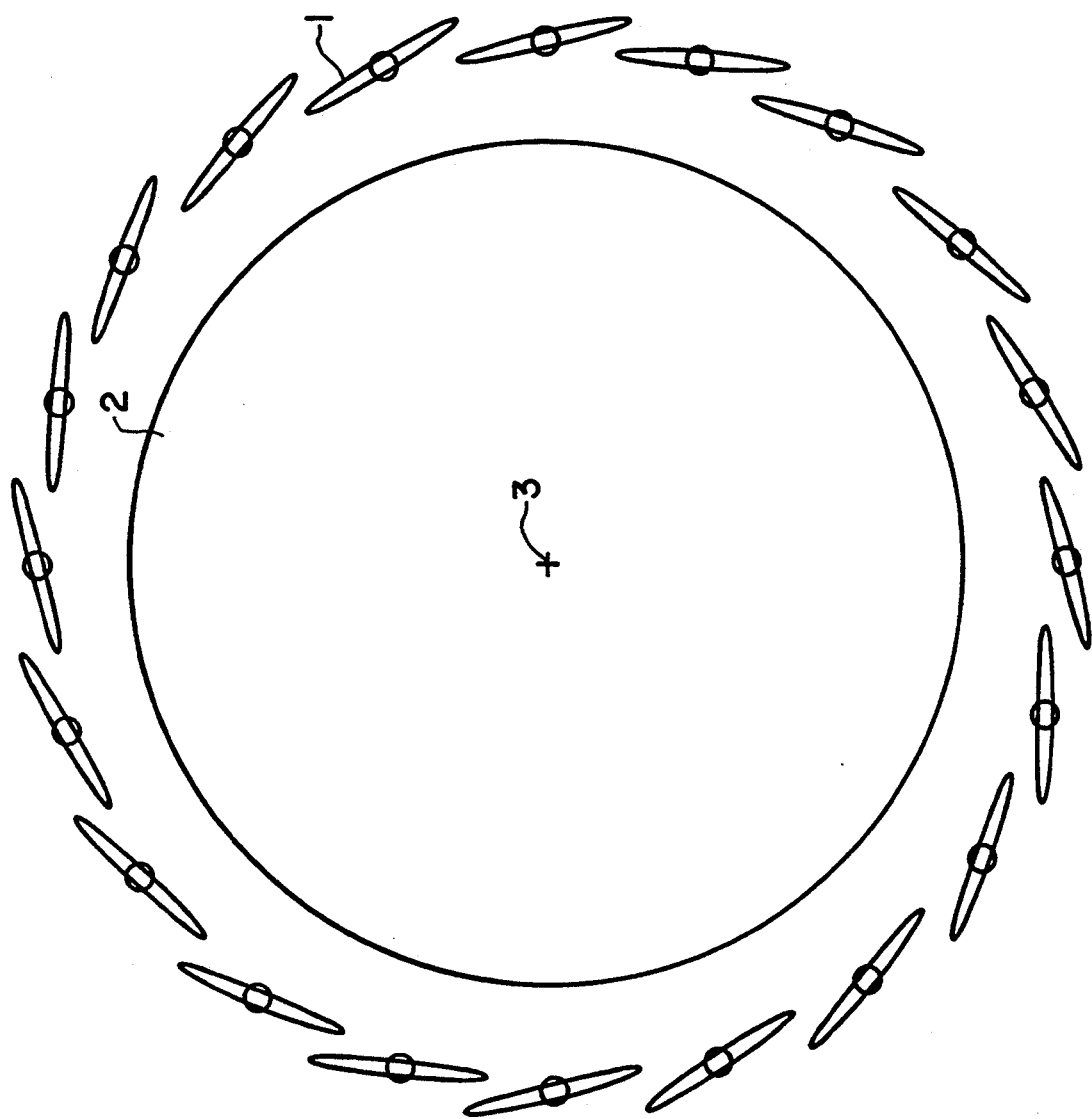
FIG. 1 is a diagram illustrating a typical turbine.

The invention is explained below referring to the drawings.

FIG. 1 shows a typical turbine unit, for example, having twenty elliptically contoured wicket gates (1) of stainless steel construction oriented in a circle surrounding a runner or impeller crown (2). The turbine unit center is (3).

Typically, the orientation of each wicket gate is adjustable around a stem axis. Each wicket gate has a wicket gate operating lever. These wicket gate operating levers are connected to a common gate operating ring via connection links for synchronous rotation of all gates during opening or closing. Eccentric pins are provided at all operating ring connection points for individual wicket gate adjustments, Such a design is disclosed in U.S. Pat. No. 4,210,408 (Nace). Other conventional means of adjusting individual wicket gates includes using a turnbuckle.

Figure 2:
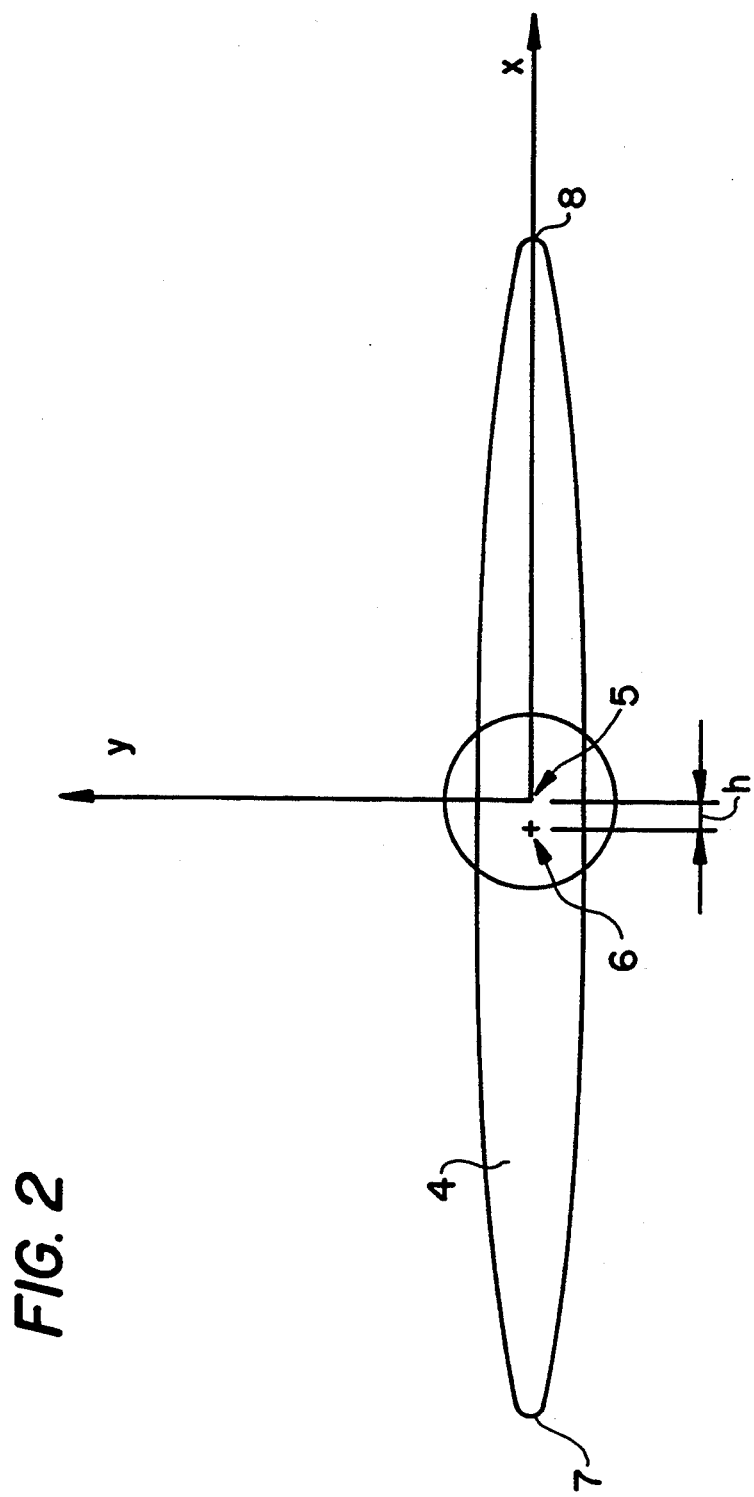
FIG. 2 is a diagram illustrating a typical wicket gate.

FIG. 2 shows a typical wicket gate (4) having a stem axis center (5), an ellipse center (6), a heel (7), and a toe (8). The orientation of the wicket gate is adjustable around the stem axis center (5).

The precision of the measurement of the correspondence rate between toe and heel clearance changes when rotating a single gate is critical. Any error is additive during the successive movements. A correspondence error of only a single thousandth's results in a substantial error of 0.019 inch at a nineteenth gate.

The following equations are used to calculate the toe and heel changes as a function of gate rotations for the wicket gates (1).

The wicket gate (4) contours are elliptically shaped and are described by the following equation, $$f_1(x,y) = \frac{(x+h)^2}{A^2} + \frac{y^2}{B^2} - 1 = 0 \quad (i)$$

where h = the distance from the stem axis (5) to the ellipse center (6),

A and B are ellipse constants. In equation (i), the coordinate origin is centered on the stem axis (5) with the toe (7) lying on the positive x-axis, as shown in FIG. 2.

Figure 3:
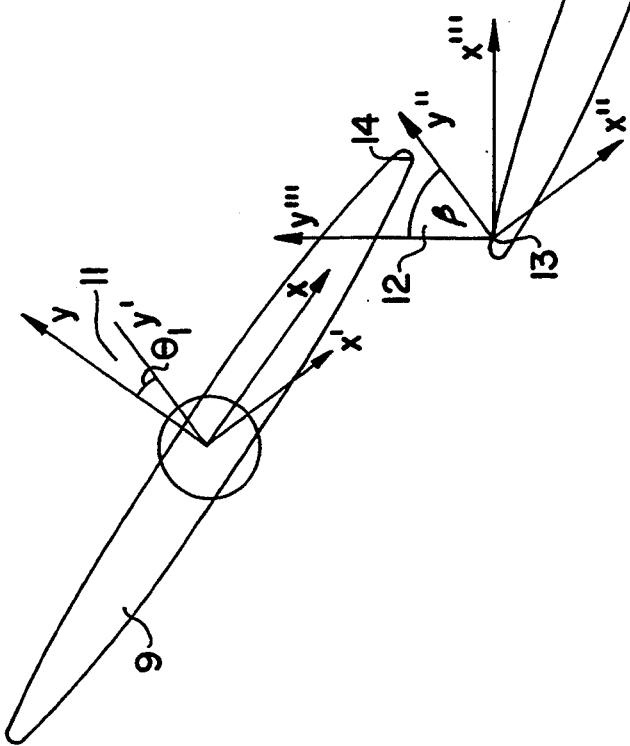
FIG. 3 is a diagram illustrating the coordinate modifications for Toe movement clearances.

FIG. 3 shows the coordinate modifications for toe movement clearances. Each wicket gate has a machined flat surface approximately two inches in width centered at the heel contact point (13). For addressing toe movement, the ellipse equation of the adjacent gate (9) is rotated, translated, and rotated once more to allow the coordinate x-axis to lie on the flat surface of gate (4) with the y-axis intersecting at the heel contact point (13), as shown in FIG. 3. The rotation ($\Theta_1$) for toe movement is shown at (11). The fixed rotation ($\beta$) to align the X'''-Axis with the heel contact point (13) is shown at (12).

The initial axis rotation occurs at the stem axis centerline to allow the ellipse equation to also be a function of gate angle $\Theta$. In an axis rotation $$x = x'\cos\Theta_1 - y'\sin\Theta_1$$

$$y = x'\sin\Theta_1 + y'\cos\Theta_1$$

where $\Theta_1$ = rotation for toe movement and the ellipse equation becomes $$f_1(x, y) = f_1(x', y', \Theta_1).$$

The axis origin is then translated to the contact point (13) located in the center of the flat surface of the stationary gate (4) by $$x' = x'' + h'$$

$$y' = y'' + k'$$

where h' = distance along the x'-axis from stem axis of gate (9) to heel contact point (13) of gate (4), k' = distance along the y'-axis from stem axis of gate (9) to heel contact point (13) of gate (4), resulting in $$f_1(x',y',\Theta_1) = f_1(x'',y'',\Theta_1).$$

The axis is given a final fixed rotation ($\beta$) so that the x''-axis lies on the flat surface using $$x'' = x'''\cos\beta - y'''\sin\beta$$

$$y'' = x'''\sin\beta + y'''\cos\beta$$

where $\beta$ = rotation to make the the x''-axis lie on the flat surface at the heel contact point (13).

giving $$f_1(x'', y'', \Theta_1) = f_1(x''',y''',\Theta_1).$$

Solving for y, the final equation is $$y''' = g_1(x''',\Theta_1) \quad (ii)$$

The final equation has three variables x, y and $\Theta_1$. When $\Theta_1 = 0$ and x = 0, $y_{min}$ will equal 0 because the toe contact point (14) is touching the heel contact point (13).

The final ellipse equation is then oriented in such a manner that with zero gate rotation the toe contact point (14) of gate (9) and the heel contact point (13) of gate (4) coincide at the origin. For any gate rotation angle, the toe clearance can be determined if the horizontal location of the minimum clearance is known.

The minimum clearance occurs at the lowest point of the ellipse contour and can be determined by taking the partial derivative of (ii) with respect to x and setting the result equal to zero.

$$\frac{\partial [g_1(x''',\Theta_1)]}{\partial x'''} = 0 \quad (iii)$$

For each gate angle $\Theta_1$, x is obtained from (iii), and the minimum clearance can be determined from (ii) as $$y^{toe}_{min} = g_1(x''',\Theta_1)| \quad x''' \rightarrow \frac{\partial[g_1(x''',\Theta_1)]}{\partial x'''} = 0.$$

The above equations are cumbersome, and (iii) requires an iterative scheme to solve for x prior to solving (ii). Moreover, (ii) needs to be solved for $\Theta_1$ which cannot be solved directly and requires another iterative scheme. The computational process requires countless clearance determinations and changes which requires extensive computer time.

$Y^{toe}_{min}$ can also be determined by programing equation (ii) into a computer and using an increment search, such as 1/2 increment search, which inputs various x-values to determine $Y^{toe}_{min}$ for different $\Theta_1$ values.

Preferably, equation (ii) is programed into a spreadsheet, such as Lotus 1-2-3, and various x-values inputted manually to determine $Y^{toe}_{min}$ for different $\Theta_1$ values.

$Y^{toe}_{min}$ at different values of $\Theta_1$ can be fitted by the following second order polynomial, which has gate clearance solely as a function of $\Theta_1$, $$y^{toe}_{min} = A_1\Theta_1^2 + B_1\Theta_1 \quad (iv)$$

where $A_1, B_1$ = constants determined by curve fitting

Equation (iv) is accurate to five decimal places and results in a maximum accumulation error of 0.2% of a thousandths for a complete gyration around the gate circle. This level of accuracy is sufficient.

$Y^{toe}_{min}$ and $\Theta_1$ can be determined manually by field measurements.

Figure 4:
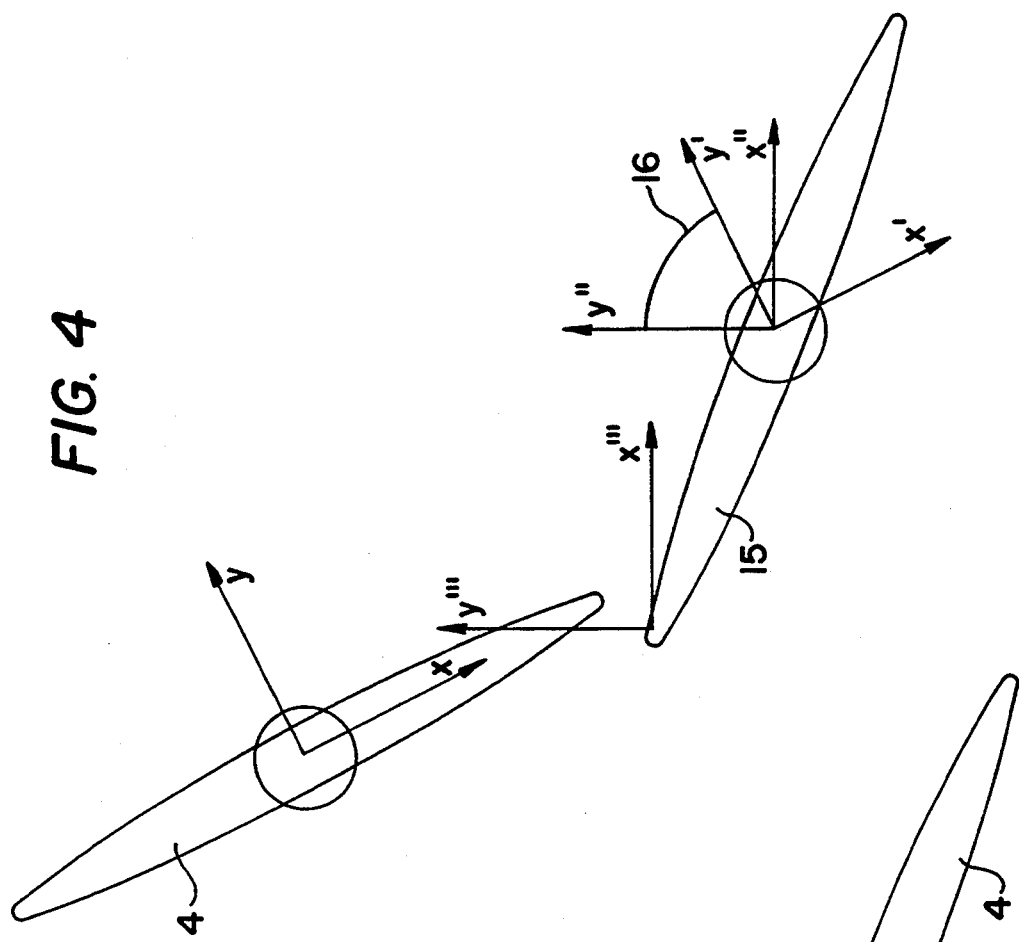
FIG. 4 is a diagram illustrating the coordinate modifications for Heel movement clearances.

FIG. 4 shows the coordinate modifications for heel movement clearances. Heel movements are obtained in a similar manner to Toe movements, but with a different succession when moving the coordinate axis, as shown in FIG. 4. Equation (i) of the stationary gate (4) is first translated to the stem axis of the gate (15) by $$X' = x + h''$$

$$y' = y + k''$$

where $h''$ = distance along the x-axis from stem axis of gate (4) to stem axis of gate (15), $k''$ = distance along the y-axis from stem axis of gate (4) to stem axis of gate (15), resulting in $$f_2(x, y) = f_2(x', Y')$$

Rotation (16) is now introduced at the stem axis centerline of the gate (15) to rotate the x', y' coordinate system to the x'', y'' coordinate system, which results in $$f_2(x',y') = f_2(x'',y'',\Theta_2)$$

where $\Theta_2$ is negative rotation which provides heel movement. The rotation (16), $\beta - \Theta_2$, aligns the x'''-axis with the flat heel contact surface.

The axis is now translated to the contact point in the flat surface of the heel area by $$x''' = x'' + h'''$$

$$y''' = y'' + k'''$$

where $h'''$ = distance along the x''-axis from stem axis of gate (15) to heel contact point of gate (15), $k'''$ = distance along the y''-axis from stem axis of gate (15) to heel contact point of gate (15), resulting in $$f_2(X'',y'') = f_2(x''',y''',\Theta_2)$$

or, $$y''' = g_2(x''',\Theta_2) \quad (v)$$

This is the final equation for heel movement. The rotation angle must be given an initial rotation for toe and heel contact points to coincide at the coordinate origin. The angle is then incremented downward by $-\Theta_2$ to determine heel clearances.

Equation (v) can be partially differentiated with respect to x and set equal to zero and solved for x to locate $y^{heel}_{min}$ values for different $\Theta_2$ values. However, as in the former case for toe clearances, the computational process requires countless clearance determinations and changes which requires extensive computer time.

$Y^{heel}_{min}$ can also be determined by programing equation (v) into a computer and using an increment search, such as ½ increment search, which inputs various x-values to determine $Y^{heel}_{min}$ for different $\Theta_2$ values.

Preferably, equation (v) is programed into a spreadsheet, such as Lotus 1-2-3, and various x-values inputted manually to determine $Y^{heel}_{min}$ for different $\Theta_2$ values.

$Y^{heel}_{min}$ at different values of $\Theta_2$ can be fitted by the following second order polynomial, which has gate clearance solely as a function of $\Theta_2$ $$y^{heel}_{min} = A_2\Theta_2^2 + B_2\Theta_2 \quad (vi)$$

where $A_2, B_2$ = constants determined by curve fitting $Y^{heel}_{min}$ and $\Theta_1$ can be determined manually by field measurements.

During individual adjustments, beginning and ending clearances at one end of the gate will be known. The initial clearance is known at the other end and the desired goal is to determine how the rotation will affect this clearance. Both conditions at the toe are considered known.

Equations (iv) and (vi) are rewritten to solve for e as a function of clearance, $$\Theta_1 = f_3(y^{toe}_{min}) \quad (vii)$$

$$\Theta_2 = f_4(y^{heel}_{min}) \quad (viii)$$

Equation (vii) can be used to calculate the gate angle change $$\Delta\Theta = \Theta_{1final} - \Theta_{1initial} = f_3(y^{toe}_{minfinal}) - f_3(y^{toe}_{mininitial})$$

and (viii) can be used to find the initial heel angle $$\Theta_{2initial} = f_4(y^{heel}_{mininitial})$$

The final heel clearance can be calculated from (vi) as $$y^{heel}_{minfinal} = A_2(\Theta_{2initial} + \Delta\Theta)^2 + B_2(\Theta_{2initial} + \Delta\Theta)$$

With these final equations, one can mathematically perform a sequence of successive gate rotations around the entire gate circle and have minimal error at the last gate.

The above analysis holds the stationary gate at its closed position, or close to its closed position, in both toe and heel rotations. The individual gate angles are unknown and measurements to the level of precision needed for this analysis would be impractical, if not impossible. Not knowing the exact gate locations affects rotating gate approach angle and has an impact on accuracy. However, a typical wicket gate has a total length of nearly four feet, and end variances are typically in the range of 0–0.500 inch. This translates to a very, very small angle variance and subsequent error, but error will increase with the variance.

Stationary gate variances can be minimized because the wicket gate adjustment is controlled by, for example, eccentric pins. These pins can be rotated to a common position, and the variances will then only be due to manufacturing inaccuracies of the unit.

The variances do not have an additive effect. When closed, with all eccentric pins set at a common position, all gates will be near a closed position in a somewhat random arrangement. Some gates will be slightly over closed and others slightly open, all in differing amounts. The error generated by each case is opposite and when accumulated, will tend to cancel, although by nature, more gates will tend to be slightly open. As the initial readings range grows, additional gates will be slightly open as opposed to those slightly over closed, and less cancellation occurs.

The error generated by not knowing exact gate location can be controlled to a small factor. However, as the range of initial gate readings grows, the resulting computational accuracy will diminish. For best computational results, care should be taken to have initial gate settings as near closed as possible.

Preferably, the initial gate settings should be in the range of 0 to 0.300. If the initial gate settings are outside this range, the adjustment process may have to run more than once to achieve the desired range of final gate settings.

Figure 5:
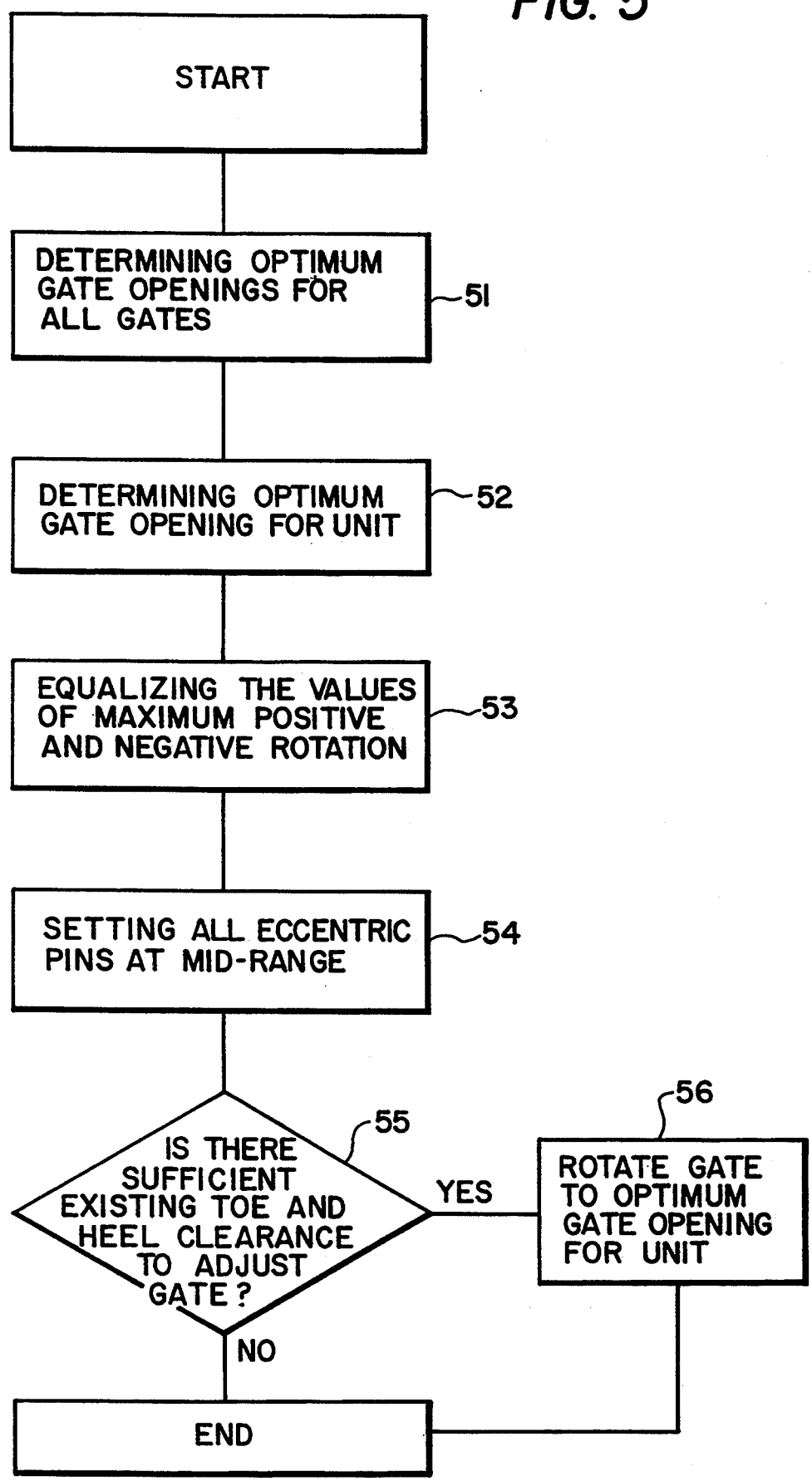
FIG. 5 is a flow chart of a preferred embodiment.

Preferably an adjusting program is used which does a simulation to calculate optimum gate positions based only on initial face-to-face readings, and provide a systematic sequence to adjust individual gates to their optimum position thereby minimizing errors that may arise from adjustment, as shown in FIG. 5.

The preferred program uses an iterative scheme for locating optimum gate positions for each individual gate (S1). In the simulation, one gate is held fixed, beginning with A-gate, and the remaining gates are sequentially rotated to a common selected opening. The final gap between the last rotated gate and the fixed gate is compared with this common opening, and the selected opening is incremented as necessary for another gyration. The iteration continues until the final gap equals the selected opening; this is the optimum opening for the fixed gate. The entire scheme is then repeated holding the next gate fixed in the simulation and continued until optimum gate openings are known for all gates.

Preferably the "half-increment" method is used for incrementing the wicket gate openings. In the "half-increment" method, a starting increment is arbitrarily chosen, for example, 20 thousands of an inch. The starting increment is added to all of the rotating gate openings and the final gap between the last rotated gate and the fixed gate is determined. If the final gap is equal to the common opening, this is the optimum opening for the gate. Each time the difference between the final gap and the common opening changes sign, the increment is divided by negative two and added to all of the rotating gate openings. The optimum gate opening is when the final gap equals the increment. Preferably the optimum gate opening is determined to precision of + or −0.00005 inch.

The wicket gate with the optimum gate opening nearest to the average of the initial lowest and highest readings is selected as the best optimum gate opening for the unit (S2). Alternatively, the wicket gate with the optimum gate opening nearest to the average of the initial gate readings can also be selected as the best optimum gate opening for the unit (S2).

The program stores required individual gate rotations necessary to adjust from the initial readings to final optimum locations.

Preferably, prior to taking initial gate readings, the gates are synchronously opened to approximately 50% by rotating the operating ring and the adjustment means, such as eccentric pins, are set at mid-range position (S4). When eccentric pins are used, the eccentric pins can be set at mid range position, for example, by placing a straight bar through the slots of the eccentric pin and the corresponding pin at the other end of the connecting link. The gates are then synchronously closed by rotating the operating ring. More preferably, the gates are closed so that the minimum gate clearance is about 50 thousands of an inch, and most preferably in the range of 0 to 50 thousands of an inch. The equations are more accurate for small angles of change, and small gate clearances are measured more accurately.

Preferably, the maximum positive and maximum negative gate rotation necessary to adjust from initial readings to final optimum locations is determined and all gate rotations are equally increased or decreased in the simulation to equalize the values of maximum positive and negative rotation (S3). This has the same effect as swinging all gates slightly open or closed.

Equalizing the values of maximum positive and negative rotation, and initially setting the eccentric pins at mid-range provides the best centered starting point for adjustment and minimizes the chances of a gate adjustment being outside the adjustment range of the eccentric pin.

To minimize adjustment error, the gates are preferably adjusted in an every-other-gate sequence requiring two adjustment gyrations around the unit. For example, on a twenty wicket gate unit, if the gates are adjusted sequentially adjustment error can stack nineteen times. Conversely, if the gates in an every-other sequence adjustment error can only stack once.

Prior to adjusting each gate, the program examines existing toe and heel clearances in the simulation. If insufficient clearance exists, the gate is skipped and adjustment is attempted on the next gate in the sequence (S5). All skipped gates are adjusted after the two initial adjustment gyrations are complete and sufficient clearance is present.

Preferably all gate clearances are measured by taking the closest point between the contact surfaces of adjacent gates. The clearances can be measured by any means, such as feeler gauges.

The process provides a one-time adjustment with improved accuracy over known methods. Subsequent readings taken after swinging the gates provides surprisingly improved and repeatable data compared to known methods.

EXAMPLES

The Bath County Station, located in northwestern Virginia, is a 2100 megawatt pumped storage facility with six reversible Francis units (Allis-Chalmers Corp., York, Pa.) operating at a net head of 1080 feet. Each unit has twenty elliptically contoured wicket gates of stainless steel construction oriented in a circle surrounding the runner (or impeller) crown. The manufacturer recommended a 0.003 to 0.006 inch variance for the initial gate settings. Francis units were used in Comparative Examples 1 and 2, and in Examples 1-5.

COMPARATIVE EXAMPLE 1

The turbine manufacturer recommended using the "banding" method for gate adjustments. All operating levers were freed and cables were used to force all the gates closed. The cables were draped around the wicket gate circle exterior and pulled.

This method did not prove successful. The upper and lower gate side seals resisted movement and would not allow proper intermeshing actions for closing. After two unsuccessful attempts this method was abandoned.

COMPARATIVE EXAMPLE 2

All adjustments were determined by trial-and-error. Adjustment was difficult, because any change on one particular gate influences adjoining gates. Many times, a large, or even small, relative clearance required several gates in an area to be adjusted, and the final readings did not always reveal the anticipated results. This occurred primarily because the gates were believed to have a one-to-one correspondence rate between toe and heel clearance changes when adjusted. However, through the analytical analysis of this effort, this belief was disproved. The Maintenance Engineers would analyze existing readings and call for corrective adjustments to be made. The new readings were then re-analyzed and more corrections determined. This process went back and forth for several days, until the gates clearances were within the vicinity of a 0.050 inch variance. The manufacturer's original recommendation of a 0.003 to 0.006 inch variance appeared impossible.

EXAMPLES

Figure 7:
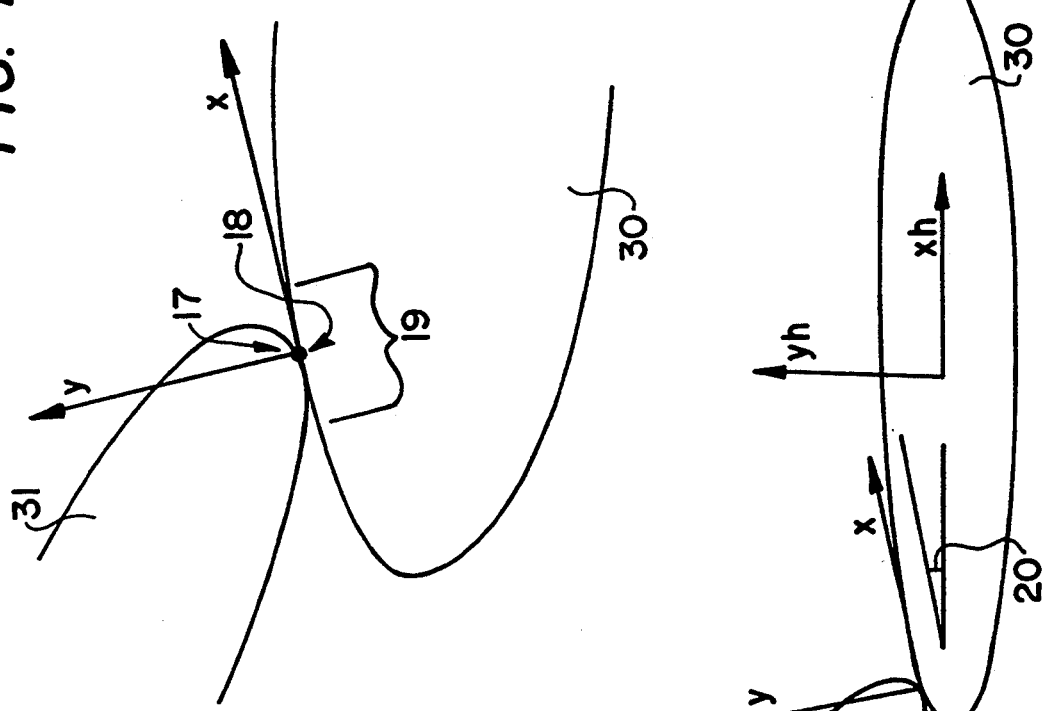
FIG. 7 is a diagram illustrating a close up of a portion of FIG. 6.
Figure 6:
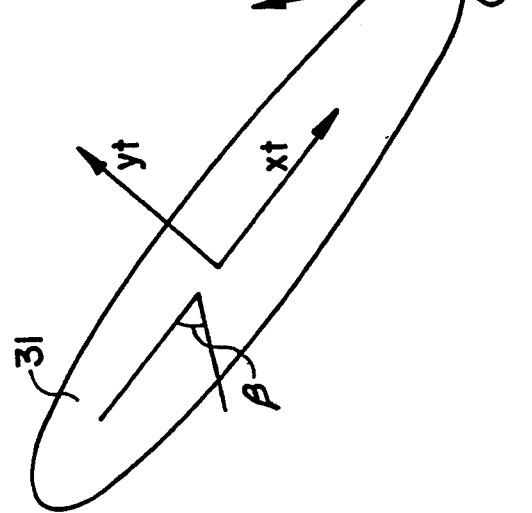
FIG. 6 is a diagram illustrating the starting coordinates for the wicket gates used in the Examples.
Figure 8:
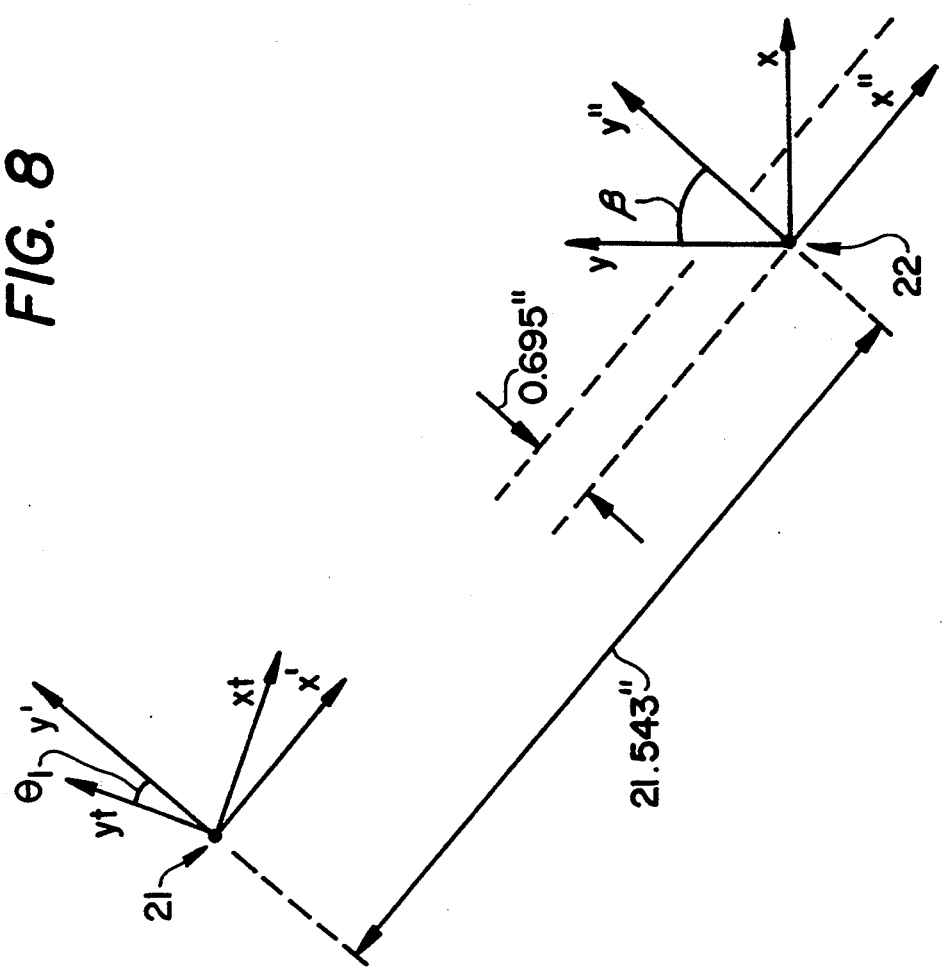
FIG. 8 is a diagram illustrating the toe coordinate modifications for the wicket gates used in the Examples.
Figure 9:
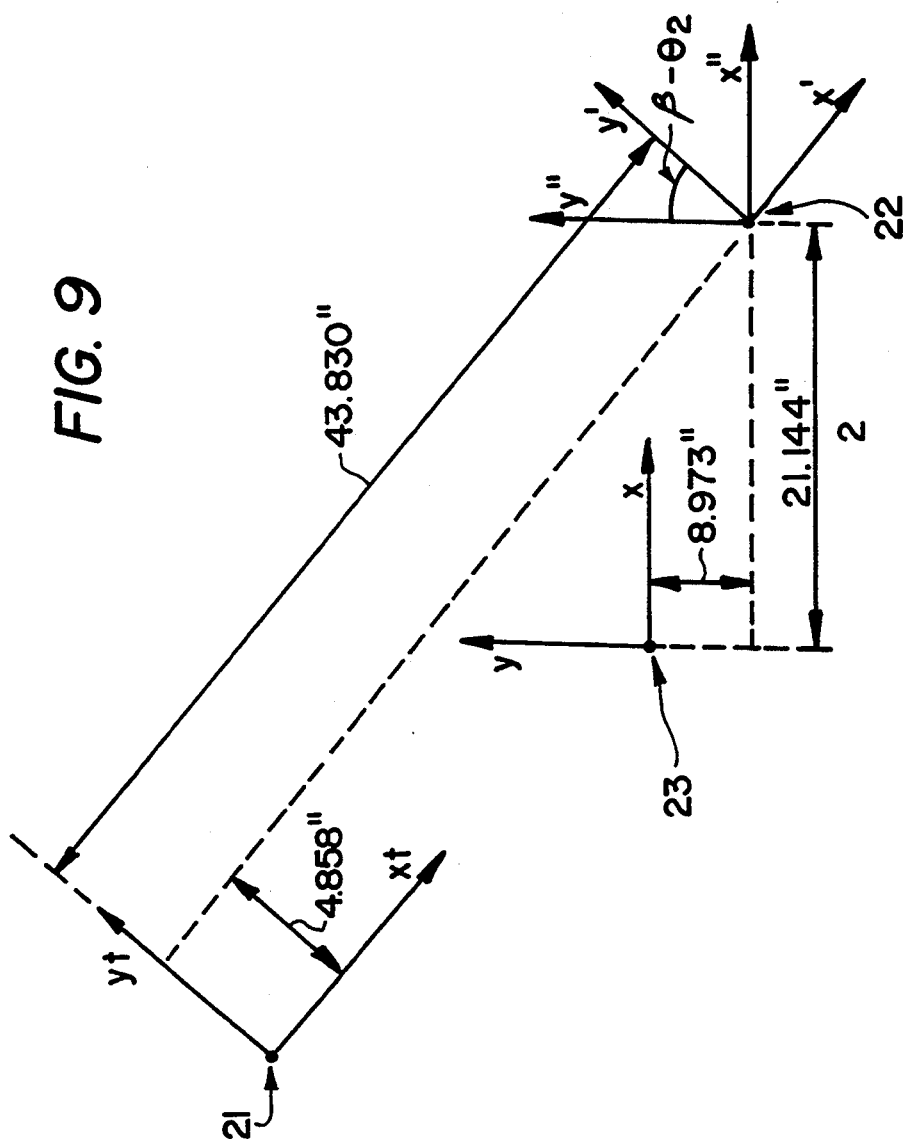
FIG. 9 is a diagram illustrating the heel coordinate modifications for such wicket gates.

The following calculations were used to determine toe and heel clearance changes as a function of gate rotations for the Bath County unit wicket gates. All measurements are in inches unless defined otherwise. The gate arrangement in cartesian coordinates is shown in FIGS. 6 and 7, where, t—starting coordinates for ellipse equation of gate (31) (origin at gate (31) stem centerline)

h—starting coordinates for equation of gate (30) (origin at gate (30) stem centerline)

The general equation for an ellipse is, $$\frac{x^2}{A^2} + \frac{y^2}{B^2} = 1$$

specifically for gate (30), $$\frac{(x_t + 1.75)^2}{A^2} + \frac{y_t^2}{B^2} = 1$$

where,

A = 23.75

B = 3.56 or, $$\frac{x_t^2 + 3.5 x_t + 3.0625}{A^2} + \frac{y_t^2}{B^2} = 1 \qquad (x)$$

A, B and the stem axis offset (1.75) were derived from OEM drawings.

Equation (x) is valid only in the $X_t$, $Y_t$ coordinates. Equation (x) was transposed to the x, y axis in such a manner to allow gate (31) rotation at the $x_t$, $y_t$ axis origin. This was accomplished by performing:

1) An axis rotation at the $x_t$, $y_t$ axis origin
2) A translation from the $x_t$, $y_t$ origin to the x,t origin.
3) A rotation at the x,y axis origin The path is: $y_t$, $y_t \rightarrow x'$, $y' \rightarrow x''$, $y'' \rightarrow x,y$ First axis rotation, $x_t = x'\cos\Theta_1 - y'\sin\Theta_1$ $y_t = x'\sin\Theta_1 + y'\cos\Theta_1$ where $\Theta_1$ is an arbitrary angle for gate rotation.

For $x_t$, $y_t \rightarrow x'$, $y'$:

Substituting into equation (x), $$\frac{x'^2\cos^2\Theta_1 - 2x'y'\sin\Theta_1\cos\Theta_1 + y'^2\sin^2\Theta_1 + 3.5x'\cos\Theta_1 - 3.5y'\sin\Theta_1 + 3.0625}{A^2} +$$

$$\frac{x'^2\sin^2\Theta_1 - 2x'y'\sin\Theta_1\cos\Theta_1 + y'^2\cos^2\Theta_1}{B^2} - 1 = 0$$

Axis translation, $x' = x'' + h'$; $h' = 21.543$ $y' = y'' + k'$; $k' = -0.695$

Figure 10:
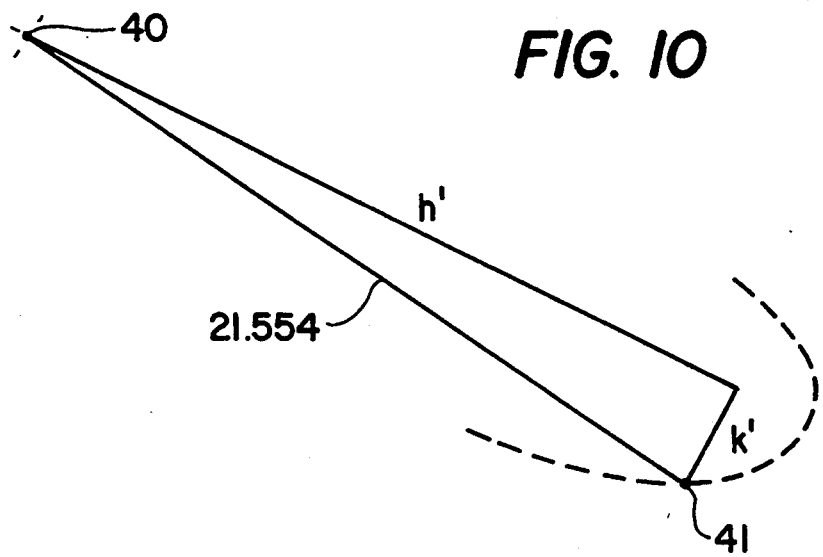
FIG. 10 is a diagram of a geometric model used to determine constants for such wicket gates.

FIG. 10 illustrates how h' and k' were determined. The OEM drawing shows 21.554 inches between stem centerline (40) and toe contact point (41), as shown in FIG. 10.

Using the pythagorean theorem, $h'^2 + k'^2 = (21.554)^2$ or, $k'^2 = (21.554)^2 - h'^2$ Using the ellipse equation, $$\frac{(h' + 1.75)^2}{A^2} + \frac{k'^2}{B^2} = 1$$

$k'^2 = B^2[1 - ((h' + 1.75)^2/A^2]$

Both equations were set equal to eliminate $k'^2$, $$(21.554)^2 - h'^2 = B^2(1 - (h' + 1.75)^2/A^2)$$
$$(21.554)^2 - h'^2 = B^2(1 - (h'^2 + 3.5h' + 3.0625)/A^2)$$
or,
$$(B^2/A^2)(h'^2 + 3.5h' + 3.0625) - h'^2 = B^2 - (21.554)^2$$
$$((B^2/A^2) - 1)h'^2 + ((3.5B^2/A^2)h' + ((3.0625/A^2) - B^2 + (21.554)^2) = 0$$

h' was solved for by quadratic formula, $$h' = \frac{-b \pm [b^2 - 4ac]^{\frac{1}{2}}}{2a}$$

$$h' = [-(3.5B^2/A^2) - [(3.5B^2/A^2)^2 - 4(((B^2/A^2) - 1)((3.0625/A^{20} - B^2 + (21.554)^2)]^{\frac{1}{2}}]/2((B^2/A^2) - 1)$$

$$h' = [-(3.5(3.56)^2/(23.75)^2) - [(3.5(3.56)^2/(23.75)^2)^2 - 4(((3.56)^2/(23.75)^2) - 1)((3.0625/(23.75)^2) - (3.56)^2 + (21.554)^2)]^{\frac{1}{2}}]/(2((3.56)^2/(23.75)^2) - 1)$$

$$h' = [0.078639512 - [0.0061841774 + 3.910264(451.97012)]^{\frac{1}{2}}]/(-1.9550632)$$

$$h' = 21.54278 \approx 21.543$$

k' was solved for by,
$$k'^2 = (21.554)^2 - h^2$$
$$k'^2 = 464.5749 - 464.09137$$
$$k' = 0.69536 \text{ but use } -0695 \text{ because translation is down in } k.$$

For $x', y', \to x'', y''$:

$$\frac{(x'' + h')^2\cos^2\Theta_1 - 2(x'' + h')(y'' + k')\sin\Theta_1\cos\Theta_1 + (y'' + k')^2\sin^2\Theta_1 + 3.5(x'' + h')\cos\Theta_1 - 3.5(y'' + k')\sin\Theta_1 + 3.0625}{A^2} +$$

$$\frac{(x'' + h')^2\sin^2\Theta_1 + 2(x'' + h')(y'' + k')\sin\Theta_1\cos\Theta_1 + (y'' + k')^2\cos^2\Theta_1}{B^2} - 1 = 0$$

OR, $$\frac{(x''^2 + 2x''h' + h'^2)\cos^2\Theta_1 - 2(x''y'' + x''k' + y''h' + h'k')\sin\Theta_1\cos\Theta_1 + (y''^2 + 2y''k' + k'^2)\sin^2\Theta_1 + 3.5(x'' + h')\cos\Theta_1 - 3.5(y'' + k')\sin\Theta_1 + 3.0625}{A^2} +$$

-continued $$\frac{(X''^2 + 2x''h' + h'^2)\sin^2\Theta_1 + 2(x''y'' + x''k' + y''h' + h'k')\sin\Theta_1\cos\Theta_1 + (y''^2 + 2y''k' + k'^2)\cos\Theta_1}{B^2} - 1 = 0$$

The final axis rotation for a fixed $\beta$: $\beta = 36.975°$
$$x'' = x\cos\beta - y\sin\beta$$
$$y'' = x\sin\beta + y\cos\beta$$

The slope of the flat surface relative to the ellipse coordinates ($\beta$) was determined by taking the derivative and evaluating at the contact point.

$$\frac{(x + 1.75)^2}{A^2} + \frac{y^1}{B^2} = 1$$

$$y^2 = B^2[1 - ((x + 1.75)^2)/A^2]$$
$$y = B[1 - ((x + 1.75)^2)/A^2]^{\frac{1}{2}}$$

if $y = B[f(x)]^n$
then,
$$dy/dx = nB[f(x)]^{n-1}f'(x)$$

where, $$dy/dx = (B/2)[1 - ((x^2 + 3.5x + 3.0625)/A^2)]^{-\frac{1}{2}}[(-2x - 3.5)/A^2]$$

$$dy/dx = [-B((2x + 3.5)/A^2)]/2[1 - ((x^2 + 3.5x + 3.0625)/A^2]^{\frac{1}{2}}$$

$$dy/dx = [-(3.56)((2(21.542784) + 3.5)/(23.75)^2)]/2[1 - (((21.542784)^2 + 3.5(21.542784) + 3.0625)/(23.75)^2]^{\frac{1}{2}}$$

$$dy/dx = -3.56(0.0825894)/2(0.1952736)$$

$$dy/dx = -0.752837 \text{ but use } 0.752837$$
because sign is not important.

$$\beta = \text{TAN}^{-1}[dy/dx] \approx 36.975°$$

$\beta$ can also be determined by measuring the angle between the flat surface at the heel of a gate and the x-axis through the center of the same gate and adding (360°/number of gates).

For $x'', y'' \to x, y$ $$\frac{(x^2\cos^2\beta - 2xy\cos\beta\sin\beta + y^2\sin^2\beta + 2h'x\cos\beta - 2h'y\sin\beta + h'^2)\cos^2\Theta_1 - 2[(x^2 - y^2)\cos\beta\sin\beta + xy\cos^2\beta - xy\sin^2\beta + k'x\cos\beta - k'y\sin\beta + h'x\sin\beta + h'y\cos\beta + h'k']\sin\Theta_1\cos\Theta_1 + (x^2\sin^2\beta + 2xy\sin\beta\cos\beta + y^2\cos^2\beta + 2k'x\sin\beta + 2k'y\cos\beta + k'^2)\sin^2\Theta_1 + 3.5(x\cos\beta - y\sin\beta + h')\cos\Theta_1 - 3.5(x\sin\beta + y\cos\beta + k')\sin\Theta_1 + 3.0625}{A^2} + $$

$$\frac{(x^2\cos^2\beta - 2xy\sin\beta\cos\beta + y^2\sin^2\beta + 2h'x\cos\beta - 2h'y\sin\beta + h'^2)\sin^2\Theta_1 + 2[(x^2 - y^2)\cos\beta\sin\beta + xy\cos^2\beta - xy\sin^2\beta + k'x\cos\beta - k'y\sin\beta + h'x\sin\beta + h'y\cos\beta + h'k']\sin\Theta_1\cos\Theta_1 + (x^2\sin^2\beta + 2xy\sin\beta\cos\beta + y^2\cos^2\beta + 2k'x\sin\beta + 2k'y\cos\beta + k'^2)\cos^2\Theta_1}{B^2} - 1 = 0 \quad \text{(xi)}$$

Equation (xi) has 3 variables x, y, and $\Theta_1$. When $\Theta_1 = 0$ and $x = 0$, $y_{min}$ will equal zero since the ellipse si touching at the contact point, as shown in FIGS. 6 and 7.

With a given rotation $\Theta_1$, the clearance y was determined, because the y position where y is minimum can be determined.

Equation (xi) was solved for y. It is a second order polynomial in y and was solved by the quadratic formula.

Equation (xi) has the form:

$$Cy^2 + Dy + E = 0$$

where, $$C = \frac{\sin^2\beta\cos^2\Theta_1 + 2\cos\beta\sin\beta\sin\Theta_1\cos\Theta_1 + \cos^2\beta\sin^2\Theta_1}{A^2} +$$

$$\frac{\sin^2\beta\sin^2\Theta_1 - 2\sin\beta\cos\beta\sin\Theta_1\cos\Theta_1 + \cos^2\beta\cos^2\Theta_1}{B^2}$$

$$D = \frac{(-2x\cos\beta\sin\beta - 2h'\sin\beta)\cos^2\Theta_1 - 2(x\cos^2\beta - x\sin^2\beta - k'\sin\beta + h'\cos\beta)\sin\Theta_1\cos\Theta_1 + (2x\sin\beta\cos\beta + 2k'\cos\beta)\sin^2\Theta_1 - 3.5\sin\beta\cos\Theta_1 - 3.5\cos\beta\sin\Theta_1}{A^2} +$$

$$\frac{(-2x\sin\beta\cos\beta - 2h'\sin\beta)\sin^2\Theta_1 + 2(x\cos^2\beta - x\sin^2\beta - k'\sin\beta + h'\cos\beta)\sin\Theta_1\cos\Theta_1 + (2x\sin\beta\cos\beta + 2k'\cos\beta)\cos^2\Theta_1}{B^2}$$

$$E = \frac{(x^2\cos^2\beta + 2h'x\cos\beta + h'^2)\cos^2\Theta_1 - 2(x^2\cos\beta\sin\beta + k'x\cos\beta + h'x\sin\beta + h'k')\sin\Theta_1\cos\Theta_1 + (x^2\sin^2\beta + 2k'x\sin\beta + k'^2)\sin^2\Theta_1 + 3.5(x\cos\beta + h')\cos\Theta_1 - 3.5(x\sin\beta + k')\sin\Theta_1 + 3.0625}{A^2} +$$

$$\frac{(x^2\cos^2\beta + 2h'x\cos\beta + h'^2)\sin^2\Theta_1 + 2(x^2\cos\beta\sin\beta + xk'\cos\beta + h'x\sin\beta + h'k')\sin\Theta_1\cos\Theta_1 + (x^2\sin^2\beta + 2k'x\sin\beta + k'^2)\cos^2\Theta_1}{B^2} - 1$$

Now, $$y = \frac{-D \pm [D^2 - 4CE]^{\frac{1}{2}}}{2C} \quad \text{(xii)}$$

Only the negative portion is used since this is the curve area of interest.

Equation (xii) was programed on a Lotus 1-2-3 spread sheet and solved for $y_{min}$ at various $\Theta_1$. x was approximately zero, and, therefore several x values around zero were inputted until y was minimized for each $\Theta_1$. The results were tabulated and are shown with the results from the heel movements.

For heel movements, the varying angle must be at the $x_h$, $y_h$ axis origin, as shown in FIGS. 6 and 7. The $x_t$, $y_t$ ellipse equation was used, but the path was:

1. Translation from $x_t$, $y_t$, to $x_h$, $y_h$ origin
2. Rotation at $x_h$, $y_h$ origin
3. Translation to x, y
   Path: $x_t, y_t \rightarrow x', y' \rightarrow x'', y'' \rightarrow x, y$ Starting with, $\dfrac{x_t^2 + 3.5y_t + 3.0625}{A^2} + \dfrac{y_t^2}{B^2} - 1 = 0$ First Translation: $x_t, y_t \rightarrow x', y'$
$x_t = x' + h''$;  $h'' = 43.830$
$y_t = y' + k''$;  $k'' = 4.858$ $[(x' + h'')^2 + 3.5(x' + h'') + 3.0625]/A^2 + (y' + k'')^2/B^2 - 1 = 0$
Or,
$[x'^2 + 2x'h'' + h''^2 + 3.5(x' + h'') + 3.0625]/A^2 + [y'^2 + 2y'k'' + k''^2]/B^2 - 1 = 0$ Rotation: $x', \rightarrow x'1, y'1$
$x' = x''\cos\phi - y''\sin\phi$;  $\phi = \beta - \Theta_2 = 36.975 - \Theta_2$
$y' = x''\sin\phi + y''\cos\phi$;  $\Theta_2$ = arbitrary gate rotation $$\frac{x''^2\cos^2\phi - 2x''y''\sin\phi\cos\phi + y''^2\sin^2\phi + 2h''(x''\cos\phi - y''\sin\phi) + h''^2 + 3.5(x''\cos\phi - y''\sin\phi) + 3.5h'' + 3.0625}{A^2} +$$

$$\frac{x''^2\sin^2\phi + 2x''y''\sin\phi\cos\phi + y''^2\cos^2\phi + 2k''(x''\sin\phi + y''\cos\phi) + k''^2}{B^2} - 1 = 0$$

Final Translation: $x'', y'' \rightarrow x, y$
$x'' = x + h'''$;  $h''' = -21.144$ $$y'' = y + k'''; \quad k''' = 8.973$$

FIGS. 10-15 illustrate how $h''$, $k''$, $h'''$, and $k'''$ was determined.

Figure 11:
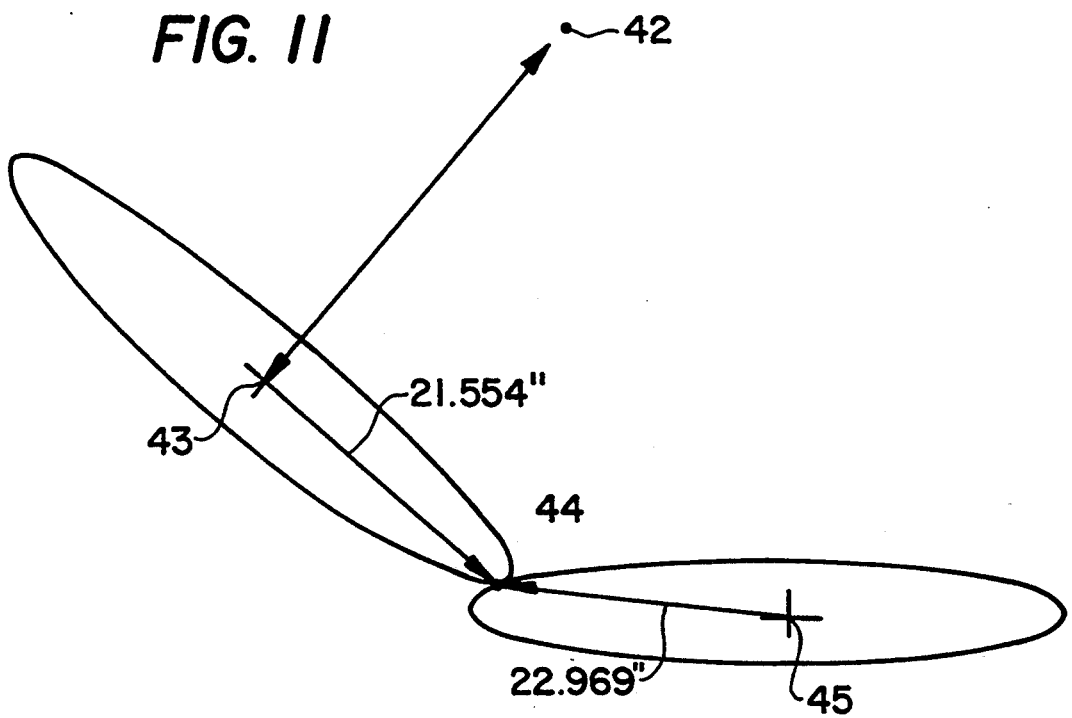
FIG. 11 is a diagram of a geometric model used to determine constants for such wicket gates.
Figure 12:
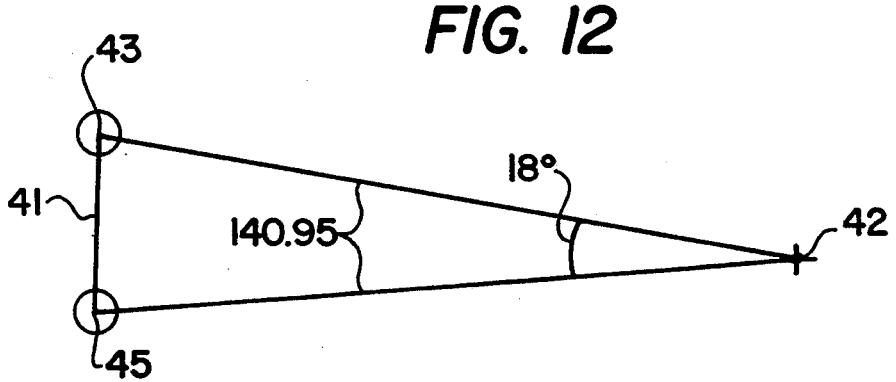
FIG. 12 is a diagram of a geometric model used to determine constants for such wicket gates.

In FIGS. 11 and 12, the distance from the stem axis (43) to the unit center (42) is 140.95. The distance from the stem axis (43) to the contact point (44) is 21.554. The distance from the stem axis (45) to the contact point (44) is 22.969.

The distance between stem axis (43) and (45) was calculated by, $$\frac{SIN18°}{L} = \frac{SIN(90-9)}{140.94}$$

$$L = \frac{140.95(SIN18°)}{SIN81°}$$

$$L = 44.098875$$

Using the law of cosines, $$A^2 = B^2 + C^2 - 2BC\,COSa_1$$

$$COSa_1 = \frac{B^2 + C^2 - A^2}{2BC}$$

$$a_1 = COS^{-1}[(B^2 + C^2 - A^2)/2BC]$$

$$a_1 = COS^{-1}[[(44.098875)^2 + (21.554)^2 - (22.969)^2]/2(44.098875)(21.559)]$$

$$a_1 = 8.1721°$$

Figure 13:
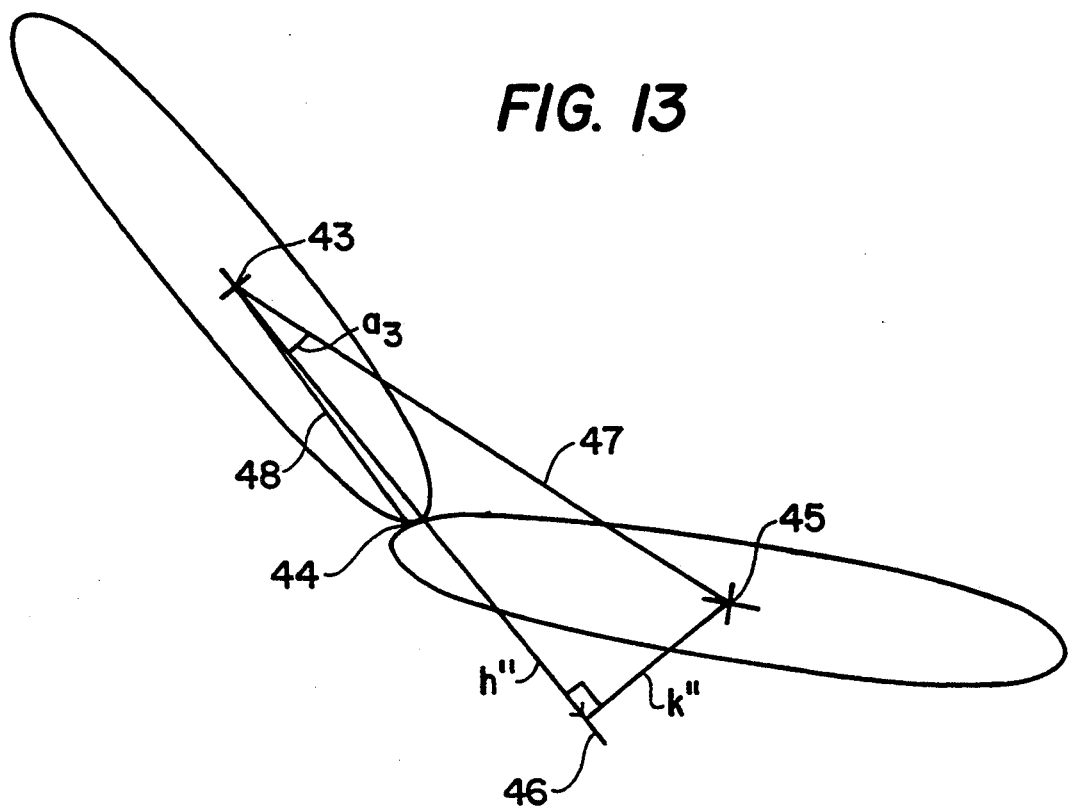
FIG. 13 is a diagram of a geometric model used to determine constants for such wicket gates.
Figure 14:
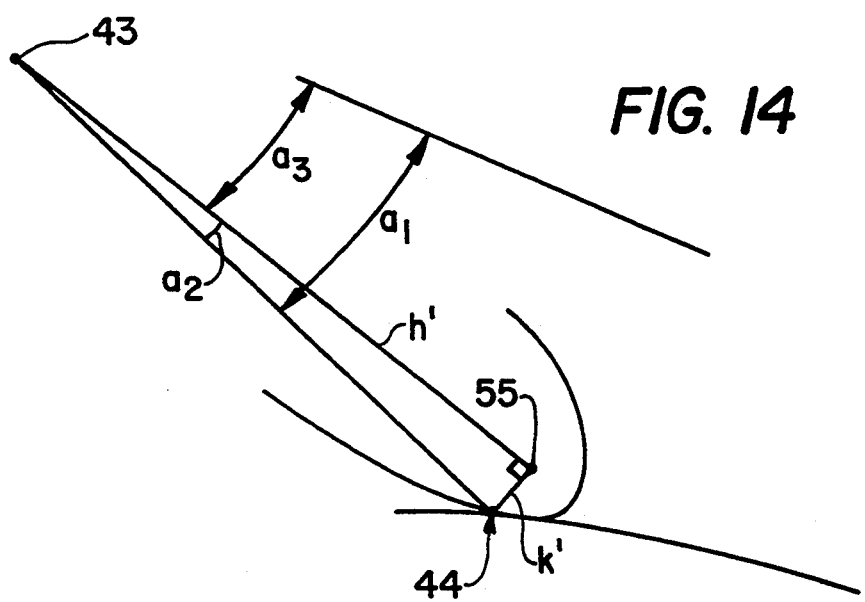
FIG. 14 is a diagram of a geometric model used to determine constants for such wicket gates.
Figure 15:
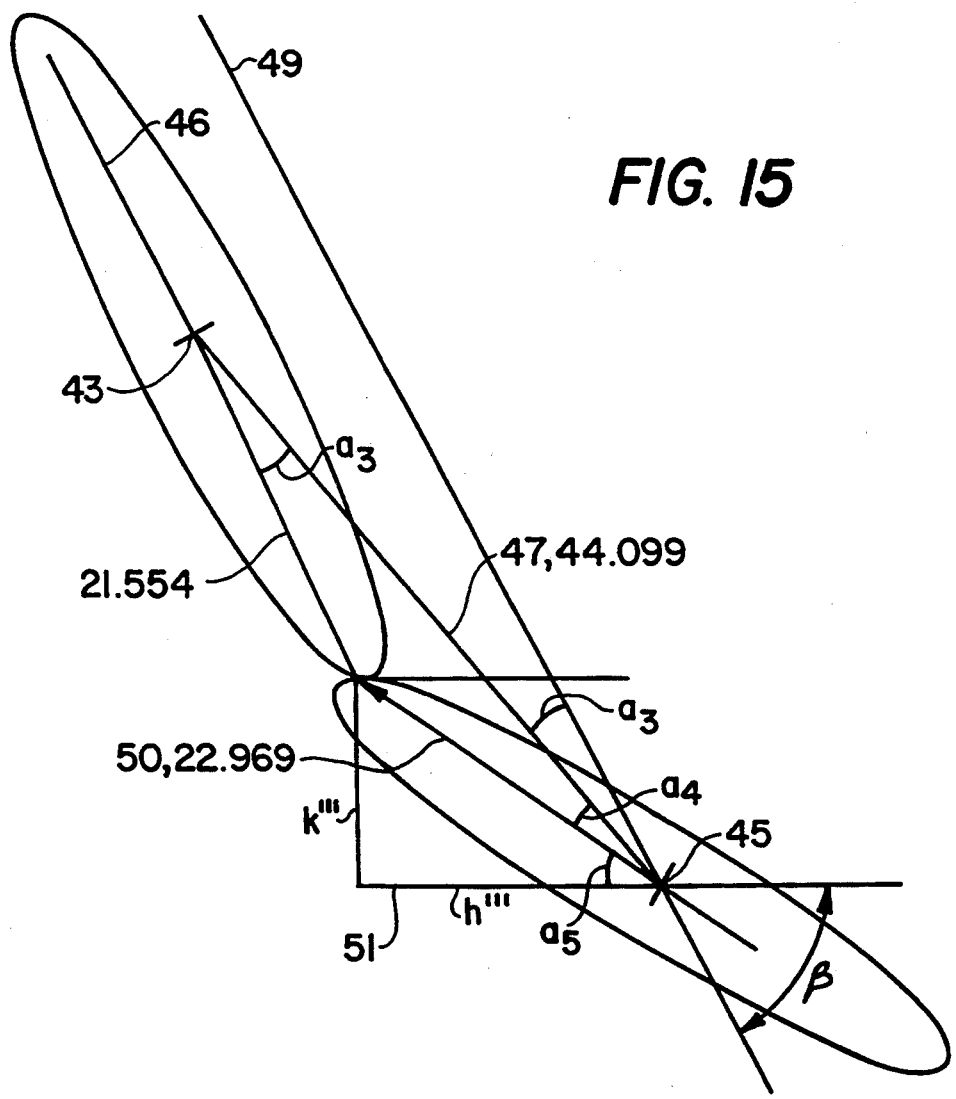
FIG. 15 is a diagram of a geometric model used to determine constants for such wicket gates.

FIG. 14 is a closeup of the area around the contact point (44) of FIG. 13. $a_1$ is the angle between line (47) and line (48). $a_2$ is the angle between the x-axis (46) of the gate and line (48). $a_3$ is the angle between the x-axis (46) and line (47). $a_4$ is the angle between line (47) and line (50). $a_5$ is the angle between line 50 and line 51. Lines (49) and (46) are parallel.

The distance between the stem axis (43) and point (55) is $h'$.

$a_2 = \tan^{-1}(k'/h')$ the absolute value of $k'$ is used in this equation.

$a_2 = \tan^{-1}(0.695/21.543) = 1.847°$
$a_3 = a_1 - a_2 = 8.1721 - 1.847 = 6.325°$
$h'' = 44.099\,COSa_3 = 43.830$
$k'' = 44.099\,SINa_3 = 4.858$ Using the law of cosines, $$a_4 = COS^{-1}[((44.099)^2 + (22.969)^2 - (21.554)^2)/(2(44.099)(22.969))]$$

$$a_4 = 7.665°$$

$$a_5 = \beta - a_3 - a_4$$

$$a_5 = 36.975 - 6.325 - 7.665$$

$$a_5 = 22.985$$

$h''' = 22.969\,COSa_5 = 21.144 \rightarrow -21.144$
because $h'''$ is translating back.

$k''' = 22.969\,SINa_5$ $k''' = 8.973$

For $x'', y'' \rightarrow x, y$:

$$\frac{(x + h''')^2 COS^2\phi - 2(x + h''')(y + k''')SIN\phi COS\phi + (y + k''')^2 SIN^2\phi + 2h'' [(x + h''')COS\phi - (y + k''')SIN\phi] + h''^2 + 3.5[(x + h''')COS\phi - (y + k''')SIN\phi] + 3.5h'' + 3.0625}{A^2} +$$

$$\frac{(x + h''')^2 SIN^2\phi + 2(x + h''')(y + k''')SIN\phi COS\phi + (y + k''')^2 COS^2\phi + 2k'' [(x + h''')SIN\phi + (y + k''')COS\phi] + k''^2}{B^2} - 1 = 0$$

Or, $$\frac{(x^2 + 2h'''x + h'''^2)COS^2\phi - 2(xy + xk''' + yh''' + h'''k''')SIN\phi COS\phi + (y^2 + 2k'''y + k'''^2)SIN^2\phi + 2h'[(x + h''')COS\phi - (y + k''')SIN\phi] + h''^2 + 3.5[(x + h''')COS\phi - (y + k''')SIN\phi] + 3.5h'' + 3.0625}{A^2} +$$

$$\frac{(x^2 + 2h'''x + h'''^2)SIN^2\phi + 2(xy + xk''' + yh''' + h'''k''')SIN\phi COS\phi + (y^2 + 2k'''y + k'''^2)COS^2\phi + 2k''[(x + h''')SIN\phi - (y + k''')COS\phi] + k''^2}{B^2} - 1 = 0$$

This equation is also a second order polynomial in $y$ as;

$$Fy^2 + Gy + H = O$$

where, $$F = \frac{SIN^2\phi}{A^2} + \frac{COS^2\phi}{B^2}$$

$$G = \frac{-2(x + h''')SIN\phi COS\phi + 2k''SIN^2\phi - 2h''SIN\phi - 3.5SIN\phi}{A^2} +$$

$$\frac{2(x + h''')SIN\phi COS\phi + 2k'''COS^2\phi + 2k''COS\phi}{B^2}$$

$$H = \frac{(x^2 + 2h'''x + h'''^2)COS^2\phi - 2(xk''' + h'''k'')SIN\phi COS\phi + k'''^2 SIN^2\phi + 2h''[(x + h''')COS\phi - k'''SIN\phi] + h''^2 + 3.5[(x + h''')COS\phi - k'''SIN\phi] + 3.5h'' + 3.0625}{A^2} +$$

$$\frac{(x^2 + 2h''' + h'''^2)SIN^2\phi + 2(xk''' + h'''k'')SIN\phi COS\phi + k'''^2 COS^2\phi + 2k''[(x + h''')SIN\phi + k'''COS\phi] + k''^2}{B^2} - 1$$

Again, $$y = \frac{-G - [G^2 - 4FH]^{\frac{1}{2}}}{2F}$$

This equation was also set up on a Lotus 1-2-3 spread sheet and solved for $y_{min}$ as a function of $\Theta_1$.

This equation was also set up on a Lotus 1-2-3 spread sheet and solved for $y_{min}$ as a function of $\Theta_1$.

| Clearance ($y_{min}^{toe}$) [Inches] | Gate Rotation ($\Theta_1$) [Degrees] |
|---|---|
| 0.300000 | 1.017663 |
| 0.250000 | 0.848863 |
| 0.200000 | 0.679743 |
| 0.150000 | 0.510304 |
| 0.100000 | 0.340537 |
| 0.050000 | 0.17044 |
| −0.05000 | −0.17077 |
| −0.10000 | −0.34190 |
| −0.15000 | −0.51335 |
| −0.20000 | −0.68517 |
| −0.25000 | −0.85734 |
| −0.30000 | −1.02987 |

| Clearance ($y_{min}^{heel}$) [Inches] | Gate Rotation ($\Theta_2$) [Degrees] |
|---|---|
| 0.300000 | 0.815999 |
| 0.250000 | 0.679565 |
| 0.200000 | 0.543305 |
| 0.150000 | 0.407220 |
| 0.100000 | 0.271310 |
| 0.050000 | 0.135575 |
| −0.05000 | −0.13540 |
| −0.10000 | −0.27063 |
| −0.15000 | −0.40568 |
| −0.20000 | −0.54058 |
| −0.25000 | −0.67530 |
| −0.30000 | −0.80985 |

These results can be curve fitted with a 2nd order polynomial of the form, $$y_{min} = A_n\Theta^2 + B_n\Theta_1$$

The extreme points were used to determine the constants $A_n$ and $B_n$.

$$y_{min}^{toe} = A_1\Theta_1^2 + B_1\Theta_1$$

$$0.300000 = A_1(1.017663)^2 + B_1(1.017663) \quad \text{(xv)}$$
$$= A_1(1.03563798) + B_1(1.017663)$$

$$-0.30000 = A_1(-1.02987)^2 + B_1(-1.02987) \quad \text{(xx)}$$
$$= A_1(1.0606322) + B_1(-1.02987)$$

Equation (xv) was multiplied by a constant to make the $A_1$ term equal to the A1 term in equation (xx), then equation (xx) was subtracted from equation (xv).

$$0.3072402 = A_1(1.0606322) + B_1(1.04222343)$$
$$0.30000 = A_1(1.0606322) + B_1(1.02987)$$
$$0.6072402 = B_1(2.07209343)$$
$$B_1 = 0.2930564$$
$$A_1 = \frac{B_1(1.02987) - 0.3}{1.060632}$$
$$A_1 = 0.017065$$
$$Y_{min}^{toe} = (0.017065)\Theta_1^2 + (0.2930564)\Theta_1$$

HEEL:
$$Y_{min}^{heel} = A_2\Theta_2^2 + B_2\Theta_2$$

$$0.300000 = A_2(0.815999)^2 + B_2(0.815999)$$
$$= A_2(0.6658544) + B_2(0.815999)$$
$$-0.3000 = A_2(-0.80985)^2 + B_2(-0.80985)$$
$$= A_2(0.6555857) + B_2(-0.80985)$$

$$0.295373 = A_2(0.6555857) + B_2(0.8034148)$$
$$0.30000 = A_2(0.6555857) + B_2(0.80985)$$
$$0.5955373 = B_2(1.6132648)$$

$$B_2 = 0.3690485$$
$$A_2 = \frac{0.30000 - B_2(0.815999)}{0.6658544}$$
$$A_2 = 0.0017169$$

$$Y_{min}^{heel} = (0.0017169)\Theta_2^2 + (0.3690485)\Theta_2$$

$Y_{min}^{toe}$ and $Y_{min}^{heel}$ were solved for $\Theta_1$ and $\Theta_2$.

TOE:
$$A_1\Theta_1^2 + B_1\Theta_1 - y_{min}^{toe} = 0$$

$$\Theta_1 = \frac{-B_1 + [B_1^2 + 4A_1 y_{min}^{toe}]^{\frac{1}{2}}}{2A_1} \quad \text{(T)}$$

$$\Theta_2 = \frac{-B_2 + [B_2^2 + 4A_2 y_{min}^{heel}]^{\frac{1}{2}}}{2A_2} \quad \text{(H)}$$

The initial and final toe clearances were known. The initial heel clearance was also known. The object was to determine the final heel clearance.

$Y_{min\ initial}^{toe}$ was known and equation (T) was used to find $\Theta_{1initial}$.

$Y_{min\ final}^{toe}$ was known and equation (T) was used to find $\Theta_{1final}$.

$\Delta\Theta_1 = \Theta_{1final} - \Theta_{1initial}$ $Y_{min\ final}^{heel}$ was known and equation (H) was used to find $\Theta_{2initial}$.

$\Theta_{2final} = \Theta_{2initial} + \Delta\Theta_1$ $\Theta_{2final}$ can be inputted into $Y_{min}^{heel} = A_2\Theta_2^2 + B\Theta_2$ determine $Y_{min}^{heel}$.

With these equations, the resulting heel clearance changes were accurately determined when the toe clearance was changed by a specified amount. The constants determined for the Bath County units above, and the equations above were used in the following computer program to adjust the Bath County units as shown in the Examples.

```
C WICKET GATE ADJUSTMENT DETERMINATION PROGRAM      C. W. PROPST
C
C THIS PROGRAM TAKES AN EXISTING SET OF GATE READINGS AND
C CALCULATES REQUIRED CORRECTIONS TO ATTAIN SYNCHRONOUS READINGS
C ON ALL GATES.
C
C USE ONLY WITH THE FOLLOWING CONDITIONS AND PROCEDURE:
C
C      1)   ALL WICKET GATE LINKAGES MUST BE ASSEMBLED PRIOR TO
C           ADJUSTMENT.  OPEN ALL GATES USING SERVO'S TO
C           APPROXIMATELY 50%.
C
C      2)   ECCENTRIC PINS IN GATE OPERATING RING MUST BE
C           ROTATED TO MID-RANGE ADJUSTMENT ("H" MARK ADJACENT TO
C           SIDE OF LINK TOWARDS OPERATING RING WITH SLOT PARALLEL
C           TO LINK)  IF ECCENTRICS EXIST IN THE SHEAR ARMS, THEY
C           SHOULD BE REPLACED WITH STRAIGHT PINS.  THIS PROGRAM
C           WILL INDICATE WHEN ECCENTRICS ARE NEEDED AT THESE POINTS.
C
C      3)   CLOSE ALL GATES USING SERVO'S UNTIL THE MINIMUM GATE
C           OPENING IS (0-50) THOUSANDTHS.  LOCK GATE OPERATING
C           RING TO PREVENT MOVEMENT.
C
C      4)   TAKE ALL GATE OPENING READINGS AND INPUT INTO PROGRAM
C           AS DIRECTED.  THE PROGRAM WILL GENERATE NEEDED
C           CORRECTIONS IN THE OPTIMUM ORDER.
C
C PARAMETERS:
C      A  - ARRAY FOR INITIAL GATE READINGS
C      B  - ARRAY FOR GATE READINGS MANIPULATION DURING INCREMENTING
C           AND ADJUSTMENT
C      C  - ARRAY FOR INDICATED WHICH GATES HAVE BEEN ADJUSTED
C      D  - CHARACTER ARRAY FOR GATE IDENTIFICATION LETTERS
C      E  - ARRAY FOR STORING OPTIMUM GATE OPENING GENERATED BY
C           ITERATING EACH GATE
C    AVE  - AVERAGE OF HIGHEST AND LOWEST INITIAL GATE READINGS
C    BST  - BEST GATE HAVING OPTIMUM GATE OPENINGS CLOSEST TO 'AVE'
C    CNG  - GAP CHANGE DURING ITERATIONS OF INCREMENTING
C    COR  - CORROLATION BETWEEN TOE AND HEEL OF GATE
C    ERR  - ERROR INDICATOR USED TO INDICATE WHEN ALL GATES HAVE
C           BEEN ADJUSTED
C    GAP  - REMAINING END-GAP WHEN GATES ARE ROTATED TO A SELECTED
C           OPENING
C    M,N  - LOOP COUNTERS FOR STOPPING PROGRAM IF GATES CANNOT BE
C           INCREMENTED OR ADJUSTED TO REQUIRED SETTING
C     MN  - MINIMUM INITIAL GATE READING
C     MX  - MAXIMUM INITIAL GATE READING
C    POS  - GATE POSITION WHICH IS HELD CONSTANT WHILE ALL OTHERS
C           ARE ITERATED TO OPTIMUM POSITION
C      R  - ARRAY FOR STORING GATE ROTATION DURING INCREMENTING
C    SEL  - SELECTED OPENING WHICH IS CHANGED DURING ITERATION
C   TGAP  - GAP FROM PREVIOUS ITERATION OF GATE INCREMENTING
C    YTI  - INITIAL TOE CLEARANCE
C    YTF  - FINAL TOE CLEARANCE
C    YHI  - INITIAL HEEL CLEARANCE
C    YHF  - FINAL HEEL CLEARANCE
C
C MAIN PROGRAM
C
      REAL COR,GAP,A(20),B(20),E(21),R(20),AVE,SEL,MN,MX,BST
      INTEGER POS,ERR,C(20)
      CHARACTER*1 D(20)
C
C ASSIGN GATE IDENTIFICATION LETTERS.
      D(1)='A'
      D(2)='B'
      D(3)='C'
```

```
              D(4)='D'
              D(5)='E'
              D(6)='F'
              D(7)='G'
              D(8)='H'
              D(9)='I'
              D(10)='J'
              D(11)='K'
              D(12)='L'
              D(13)='M'
              D(14)='N'
              D(15)='O'
              D(16)='P'
              D(17)='Q'
              D(18)='R'
              D(19)='S'
              D(20)='T'
C
C ESTABLISH FINAL GATE TOLERANCE DURING ITERATION.
              TOL=0.00005
C
C OPEN FILE TO OUTPUT FINAL ADJUSTMENTS.
              OPEN(4,FILE='LPT1')
C
C OPEN FILE TO INPUT INITIAL WICKET GATE READINGS
C AND READ FILE.
              OPEN(5,FILE='WICKET.DAT')
              READ(5,23)(A(I),I=1,20)
           23 FORMAT(F12.3)
              GO TO 72
C
C THE FOLLOWING SECTION COMMENCES ONLY AFTER ALL TWENTY ITERATIONS
C ARE COMPLETE AND EACH GATE HAS A SPECIFIED OPTIMUM POSITION FOR
C THE REMAINING GATES WITH IT HELD CONSTANT.  ONE FINAL ITERATION
C OCCURS AFTER THE BEST GATE IS SELECTED WITH THAT GATE HELD CONSTANT.
C
C SEARCH FOR GATE WITH BEST OPTIMUM ITERATED POSITION WHICH
C IS CLOSEST TO MID-RANGE OF INITIAL GATE READINGS.
           73 MN=A(1)
              MX=A(1)
              DO 82,J=1,19
              IF(A(J+1).GT.MX)MX=A(J+1)
              IF(A(J+1).LT.MN)MN=A(J+1)
           82 CONTINUE
              AVE=(MN+MX)/2.0
              BST=E(1)
              DO 74,J=1,19
              IF(ABS(AVE-E(J+1)).GT.ABS(AVE-BST))GO TO 74
              BST=E(J+1)
              POS=J+1
              SEL=A(J+1)
           74 CONTINUE
              GO TO 76
C
C ESTABLISH COUNTER TO SEQUENTIALLY HOLD SPECIFIC GATES CONSTANT
C WHILE INCREMENTING REMAINING GATES TO THEIR OPTIMIM POSITION.
           72 K=0
           70 K=K+1
              IF(K.EQ.21)GO TO 73
              POS=K
              SEL=A(K)
C
C BEGIN INCREMENTING GATES TO OPTIMUM, SYNCHRONOUS POSITION WITH
C ONE SELECTED GATE HELD CONSTANT STARTING WITH A-GATE.
           76 TGAP=10.0
              CNG=0.020
              GO TO 10
```

```
   11 TGAP=GAP
C ASSIGN GATE OPENINGS TO MANIPULATING ARRAY.
   10 DO 20,I=1,20
   20 B(I)=A(I)
C INITIALIZE GATE ROTATIONS.
   71 DO 2,I=1,20
    2 R(I)=0
C ROTATE GATES TO SELECTED GATE OPENING.
      DO 3,I=1,19
      IF(20-(POS+I))4,5,6
C ROTATION OF T-GATE
    5 R(20)=B(20)-SEL
      CALL CORRESPOND(B(20),SEL,B(1),YHF)
      B(20)=SEL
      B(1)=YHF
      IF(I.LT.19)GO TO 3
      GAP=B(1)
      GO TO 3
C ROTATION OF FIRST GATE FROM SELECTED UNROTATED GATE THROUGH S-GATE.
    6 R(POS+I)=B(POS+I)-SEL
      CALL CORRESPOND(B(POS+I),SEL,B(POS+I+1),YHF)
      B(POS+I)=SEL
      B(POS+I+1)=YHF
      IF(I.LT.19)GO TO 3
      GAP=B(POS+I+1)
      GO TO 3
C ROTATION OF A-GATE UP TO THE SELECTED UNROTATED GATE.
    4 R(POS+I-20)=B(POS+I-20)-SEL
      CALL CORRESPOND(B(POS+I-20),SEL,B(POS+I-19),YHF)
      B(POS+I-20)=SEL
      B(POS+I-19)=YHF
      IF(I.LT.19)GO TO 3
      GAP=B(POS+I-19)
    3 CONTINUE
C DETERMINE IF THE PRESENT INCREMENTED GATE OPENINGS ARE CLOSE ENOUGH
C TO THE FINAL END-GAP.
      IF(ABS(GAP-SEL).LE.TOL)GO TO 75
C IF THE END-GAP DIFFERS FROM THE SELECTED OPENING, CHANGE THE OPENING
C AS NECESSARY.  THE "HALF-INCREMENT SEARCH" METHOD IS UTILIZED.
      GAP=GAP-SEL
      IF(GAP*TGAP)8,12,12
    8 CNG=CNG/2.0
   12 IF(GAP)7,7,9
    7 SEL=SEL+CNG
      GO TO 11
    9 SEL=SEL-CNG
      GO TO 11
   75 E(K)=SEL
      IF(K.LE.20)GO TO 70
C
C THE FOLLOWING SECTION OPTIMIZES THE GATE ROTATIONS TO THE INITIAL
C INPUT READINGS AND MINIMIZES THE NEED FOR ADDITIONAL ECCENTRIC
C PINS IN GATE OPERATING LEVERS.
C
C DETERMINE SWING TO EQUALIZE POSITIVE AND NEGATIVE ROTATIONS.
      RL=R(1)
      RH=R(1)
      DO 13,J=1,20
      IF(R(J).LT.RL)RL=R(J)
      IF(R(J).GT.RH)RH=R(J)
   13 CONTINUE
      RA=(RL+RH)/2.0
      DO 65,J=1,20
   65 R(J)=R(J)-RA
C
C THE FOLLOWING SECTION PERFORMS A TRIAL ADJUSTMENT AND MAKES
C NECESSARY ROTATION MODIFICATIONS TO ALLOW ADJUSTMENT ON ALL GATES.
```

```
C
C ESTABLISH COUNTER TO DETERMINE WHEN GATES ARE ADJUSTED AND ASSIGN
C ORIGINAL READINGS TO TEMPORARY ARRAY.
      M=0
   42 DO 19,I=1,20
      C(I)=1
      B(I)=A(I)
   19 CONTINUE
C PERFORM TRIAL ADJUSTMENTS.
      N=0
   32 N=N+1
C EVERY OTHER GATE IS ADJUSTED, STARTING WITH A-GATE, IF ADJACENT
C GATE CLEARANCES ARE SUFFICIENT. WHEN CLEARANCES ARE TOO TIGHT,
C THAT PARTICULAR GATE IS SKIPPED AND ADJUSTED IN A LATER GYRATION.
      DO 21,I=1,19,2
      IF(C(I).EQ.0)GO TO 21
      CALL CORRESPOND(B(I),B(I)-R(I),B(I+1),YHF)
      IF(R(I))14,15,16
   14 B(I)=B(I)-R(I)
      B(I+1)=YHF
      C(I)=0
   15 GO TO 21
   16 IF((B(I)-0.005).LT.R(I))GO TO 21
      IF((YHF-0.005).LT.0.0)GO TO 21
      B(I)=B(I)-R(I)
      B(I+1)=YHF
      C(I)=0
   21 CONTINUE
C PERFORM SECOND GYRATION OF EVERY OTHER GATE ADJUSTMENT, STATRTING
C WITH B-GATE. GATES WITH INADEQUATE ADJACENT CLEARANCES ARE ALSO
C SKIPPED AS IN THE FIRST GYRATION.
      DO 31,I=1,19,2
      IF(C(I+1).EQ.0)GO TO 31
      IF(I.EQ.19)GO TO 38
      CALL CORRESPOND(B(I+1),B(I+1)-R(I+1),B(I+2),YHF)
      GO TO 39
   38 CALL CORRESPOND(B(20),B(20)-R(20),B(1),YHF)
   39 IF(R(I+1))35,36,37
   35 IF(I.EQ.19)GO TO 33
      B(I+1)=B(I+1)-R(I+1)
      B(I+2)=YHF
      C(I+1)=0
      GO TO 31
   33 B(20)=B(20)-R(20)
      B(1)=YHF
      C(20)=0
   36 GO TO 31
   37 IF(I.EQ.19)GO TO 34
      IF((B(I+1)-0.005).LT.R(I+1))GO TO 31
      IF((YHF-0.005).LT.0.0)GO TO 31
      B(I+1)=B(I+1)-R(I+1)
      B(I+2)=YHF
      C(I+1)=0
      GO TO 31
   34 IF((B(20)-0.005).LT.R(20))GO TO 31
      IF((YHF-0.005).LT.0.0)GO TO 31
      B(20)=B(20)-R(20)
      B(1)=YHF
      C(20)=0
   31 CONTINUE
C CHECK TO SEE IF TRIAL ADJUSTMENT WORKED ON ALL GATES. IF NOT,
C BEGIN ADDITIONAL GYRATIONS.
      ERR=0
      DO 30,I=1,20
   30 ERR=ERR+C(I)
      IF(N.GT.10)GO TO 17
      IF(ERR.GT.0)GO TO 32
```

```
      IF(B(1).LT.0.005)GO TO 17
      GO TO 63
C IF THE GATES CANNOT BE ADJUSTED AFTER TEN TWIN GYRATIONS TO THE
C OPTIMUM OPENING, THIS OPENING IS INCREMENTED SLIGHTLY MORE OPEN
C AND GATE ADJUSTMENT IS RE-TRIED.
   17 M=M+1
      DO 24,I=1,20
   24 R(I)=R(I)-0.002
C IF THE GATES CANNOT BE ADJUSTED AFTER TWENTY TRIES WITH SUCCESSIVE
C INCREASED OPENING, THE PROGRAM IS TERMINATED.
      IF(M.LT.20)GO TO 42
      PRINT 27
   27 FORMAT(/////,15X,'COUNTER EXCEEDED - GATES WILL NOT ADJUST!')
      GO TO 26
C
C THE FOLLOWING SECTION CARRIES OVER THE REQUIRED ROTATION
C MODIFICATIONS AS DETERMINED IN THE TRIAL ADJUSTMENT SECTION AND
C  RFORMS FINAL ADJUSTMENTS WITH INSTRUCTIONS FOR THE FIELD.
C THE LOGIC IS THE SAME AS THAT USED IN THE TRIAL ADJUSTMENT SECTION,
C BUT IS LESS RESTRICTIVE SINCE ADJUSTMENT HAS ALREADY BEEN
C DEMONSTRATED.
C
C MAKE FINAL GATE ADJUSTMENTS WITH ACCOMPANYING INSTRUCTION.
   63 DO 50,I=1,20
      C(I)=1
      B(I)=A(I)
   50 CONTINUE
      WRITE(4,66)
   56 FORMAT(//,60X,'PAGE 1 OF 3')
      WRITE(4,91)
   91 FORMAT(///)
      WRITE(4,25)
      WRITE(4,88)
   88 FORMAT(T11,'INITIAL',T26,'NOTE:',\)
      WRITE(4,93)
   93 FORMAT(T2,'IF ADJUSTMENTS ARE OVERRUN ON CLOSING,  THE GATE')
      WRITE(4,92)
   92 FORMAT(10X,'BELOW',16X,'MUST BE OPENED FULLY AND RE-ADJUSTED.',/)
   25 FORMAT(25X,'MAKE THE FOLLOWING ADJUSTMENTS IN THE GIVEN ORDER',//)
      NO=0
C PERFORM FIRST GYRATION OF EVERY OTHER GATE ADJUSTMENT
C STARTING WITH A-GATE.
   51 DO 52,I=1,19,2
      IF(C(I).EQ.0)GO TO 52
      CALL CORRESPOND(B(I),B(I)-R(I),B(I+1),YHF)
      IF(R(I))53,54,55
   53 B(I)=B(I)-R(I)
      B(I+1)=YHF
      C(I)=0
      NO=NO+1
      WRITE(4,94)
      WRITE(4,18)NO,D(I)
      WRITE(4,29)D(I),D(I),D(I+1),B(I+1)
   54 GO TO 52
   55 IF((B(I)-0.005).LT.R(I))GO TO 52
      IF((YHF-0.005).LT.0.0)GO TO 52
      B(I)=B(I)-R(I)
      B(I+1)=YHF
      C(I)=0
      NO=NO+1
      WRITE(4,94)
      WRITE(4,28)NO,D(I)
      WRITE(4,29)D(I),D(I),D(I+1),B(I+1)
   52 CONTINUE
   28 FORMAT(T5,I2,3X,'ADJUST GATE-',A1,' CLOCKWISE.')
   94 FORMAT(10X,'_____',\)
   29 FORMAT(38X,'WITH ',A1,', SET ',A1,' TO ',A1,' CLEARANCE TO ',F5.3)
```

```fortran
   18 FORMAT(T5,I2,3X,'ADJUST GATE-',A1,' TO FULL OPEN POSITION.  THEN')
C PERFORM SECOND GYRATION OF EVERY OTHER GATE ADJUSTMENT
C STARTING WITH B-GATE.
      DO 56,I=1,19,2
      IF(C(I+1).EQ.0)GO TO 56
      IF(I.EQ.19)GO TO 40
      CALL CORRESPOND(B(I+1),B(I+1)-R(I+1),B(I+2),YHF)
      GO TO 41
   40 CALL CORRESPOND(B(20),B(20)-R(20),B(1),YHF)
   41 IF(R(I+1))57,58,59
   57 IF(I.EQ.19)GO TO 60
      B(I+1)=B(I+1)-R(I+1)
      B(I+2)=YHF
      C(I+1)=0
      NO=NO+1
      WRITE(4,94)
      WRITE(4,18)NO,D(I+1)
      WRITE(4,29)D(I+1),D(I+1),D(I+2),B(I+2)
      GO TO 56
   60 B(20)=B(20)-R(20)
      B(1)=YHF
      C(20)=0
      NO=NO+1
      WRITE(4,94)
      WRITE(4,18)NO,D(20)
      WRITE(4,29)D(20),D(20),D(1),B(1)
   58 GO TO 56
   59 IF(I.EQ.19)GO TO 61
      IF((B(I+1)-0.005).LT.R(I+1))GO TO 56
      IF((YHF-0.005).LT.0.0)GO TO 56
      B(I+1)=B(I+1)-R(I+1)
      B(I+2)=YHF
      C(I+1)=0
      NO=NO+1
      WRITE(4,94)
      WRITE(4,28)NO,D(I+1)
      WRITE(4,29)D(I+1),D(I+1),D(I+2),B(I+2)
      GO TO 56
   61 IF((B(20)-0.005).LT.R(20))GO TO 56
      IF((YHF-0.005).LT.0.0)GO TO 56
      B(20)=B(20)-R(20)
      B(1)=YHF
      C(20)=0
      NO=NO+1
      WRITE(4,94)
      WRITE(4,28)NO,D(20)
      WRITE(4,29)D(20),D(20),D(1),B(1)
   56 CONTINUE
C CHECK TO SEE IF ALL GATES ARE ADJUSTED.
      ERR=0
      DO 62,I=1,20
   62 ERR=ERR+C(I)
      IF(ERR.GT.0)GO TO 51
      WRITE(4,89)
   89 FORMAT(/,25X,'RETURN THIS FORM WITH INITIALS TO THE')
      WRITE(4,83)
   83 FORMAT(25X,'MAINTENANCE ENGINEER.')
      WRITE(4,49)
C PRINT INFORMATION PAGE FOR COLLECTING FINAL CLEARANCES FROM FIELD.
      WRITE(4,68)
   68 FORMAT(//,60X,'PAGE 2 OF 3')
      WRITE(4,69)
   69 FORMAT(//,25X,'RECORD THE FINAL CLEARANCES',//)
      WRITE(4,78)
   77 FORMAT(15X,'BELOW',17X,'GATES',15X,'CLEARANCE',//)
      WRITE(4,77)
   78 FORMAT(15X,'INITIAL')
```

```
   79 FORMAT(15X,'_____',15X,A1,'-',A1,16X,'_____',/)
      DO 1,I=1,19
    1 WRITE(4,79)D(I),D(I+1)
      WRITE(4,79)D(20),D(1)
      WRITE(4,85)
      WRITE(4,86)
   85 FORMAT(/,25X,'RETURN THIS FORM WITH CLEARANCES AND')
   86 FORMAT(25X,'INITIALS TO THE MAINTENANCE ENGINEER.')
      WRITE(4,49)
C PRINT INFORMATION PAGE SUMMARIZING INITIAL AND FINAL GATE
C CLEARANCES AND REQUIRED MOVEMENTS.
      WRITE(4,67)
   67 FORMAT(//,60X,'PAGE 3 OF 3')
      PRINT 98
      WRITE(4,98)
   98 FORMAT(//////////,26X,'GATE CLEARANCES AND MOVEMENTS'/)
      WRITE(4,22)
   22 FORMAT(58X,'ECCENTRIC')
      WRITE(4,99)
   99 FORMAT(17X,'GATES ',' ','ORIGINAL',8X,'FINAL',8X,'MOVEMENT',/)
      DO 96,I=1,19
      WRITE(4,95)D(I),D(I+1),A(I+1),B(I+1),D(I),-R(I)/.558
   96 PRINT 95,D(I),D(I+1),A(I+1),B(I+1),D(I),-R(I)/.558
      PRINT 95,D(20),D(1),A(1),B(1),D(20),-R(20)/.558
      WRITE(4,95)D(20),D(1),A(1),B(1),D(20),-R(20)/.558
   95 FORMAT(18X,A1,'-',A1,2F15.3,6X,A1,' = ',F7.3)
      WRITE(4,45)
   45 FORMAT(//,18X,'NOTE: ECCENTRIC MOVEMENTS WHICH EXCEED +/- 0.250')
      WRITE(4,46)
   46 FORMAT(24X,'WILL REQUIRE INSTALLING ECCENTRIC PINS IN THE')
      WRITE(4,47)
   47 FORMAT(24X,'GATE ARM SHEAR LEVERS TO ATTAIN THE ENTIRE')
      WRITE(4,48)
   48 FORMAT(24X,'NEEDED ADJUSTMENT.')
      WRITE (4,49)
   49 FORMAT('L^')

26 STOP
      END
C
C SUBROUTINE TO CALCULATE FINAL GATE HEEL CLEARANCE BASED ON
C INITIAL AND FINAL TOE CLEARANCES AND INITIAL HEEL CLEARANCE.
C
C PARAMETERS:
C
C     A1,A2,B1,B2 - FORMULA CONSTANTS
C     DTH - GATE ANGLE CHANGE
C     TH  - INITIAL HEEL ANGLE
C     YTI - INITIAL TOE CLEARANCE
C     YTF - FINAL TOE CLEARANCE
C     YHI - INITIAL HEEL CLEARANCE
C     YHF - FINAL HEEL CLEARANCE
C
C PROGRAM
C
      SUBROUTINE CORRESPOND(YTI,YTF,YHI,YHF)
      A1=0.0017065
      B1=0.2930564
      A2=-0.0017169
      B2=0.3690485
      DTH=(-B1+SQRT(B1**2+4.0*A1*YTF))/(2.0*A1)
      DTH=DTH-(-B1+SQRT(B1**2+4.0*A1*YTI))/(2.0*A1)
      TH=(-B2+SQRT(B2**2+4.0*A2*YHI))/(2.0*A2)
      YHF=A2*(TH+DTH)**2+B2*(TH+DTH)
      RETURN
      END
```

EXAMPLE 1

Unit member 5 was adjusted using the process according to the invention.

These gates were adjusted to a 0.024 inch final variance, but three gates L, P, and M needed an additional adjustment after the process.

| GATES | UNIT #5 GATE CLEARANCES | | | |
|---|---|---|---|---|
| | ORIGINAL READINGS | FINAL AFTER PROGRAMMED ADJUSTMENT | FINAL AFTER MODIFYING THREE GATES | AFTER SWINGING GATES |
| A-B | 0.280 | 0.264 | 0.264 | 0.054 |
| B-C | 0.274 | 0.270 | 0.270 | 0.045 |
| C-D | 0.208 | 0.274 | 0.274 | 0.051 |
| D-E | 0.236 | 0.264 | 0.264 | 0.040 |
| E-F | 0.032 | 0.256 | 0.256 | 0.039 |
| F-G | 0.234 | 0.263 | 0.263 | 0.047 |
| G-H | 0.477 | 0.271 | 0.271 | 0.052 |
| H-I | 0.322 | 0.266 | 0.266 | 0.041 |
| I-J | 0.453 | 0.266 | 0.266 | 0.028 |
| J-K | 0.040 | 0.270 | 0.270 | 0.027 |
| K-L | 0.193 | 0.241 | 0.250 | 0.020 |
| L-M | 0.648 | 0.269 | 0.268 | 0.035 |
| M-N | 0.337 | 0.280 | 0.265 | 0.033 |
| N-O | 0.305 | 0.272 | 0.272 | 0.047 |
| O-P | 0.434 | 0.281 | 0.270 | 0.045 |
| P-Q | 0.275 | 0.281 | 0.270 | 0.042 |
| Q-R | 0.319 | 0.287 | 0.267 | 0.042 |
| R-S | 0.287 | 0.268 | 0.267 | 0.044 |
| S-T | 0.270 | 0.268 | 0.268 | 0.046 |
| T-A | 0.293 | 0.268 | 0.268 | 0.057 |
| MAXIMUM VARIANCE = 0.024 | | | | |

Originally, Unit #5 had five gates with two eccentric adjustment pins which strayed from design: one eccentric pin for each gate. These extra eccentrics were replaced with straight pins in hopes that the computerized process would find optimum gate positioning which would not require them. Unfortunately, program results indicated that all extra eccentrics had to be reinstalled in the identical locations from which they were removed to provide the necessary adjustment. Extra eccentrics should be kept in their original locations and rotated to mid-range adjustment for initial settings as all other eccentrics.

Unit #5 exhibited significant manufacturing machining errors. The high and low initial clearance was 0.648 and 0.032, respectively, even though all gates were set to mid-range adjustment. In the analytical development, correspondence curves were fit on data maximized at 0.300, and use in Unit #5 required excessive extrapolation which probably contributed to significant error. If other units are similar and tighter variances are desired, future adjustments may require performing the program twice.

EXAMPLE 2

Unit member 3 was adjusted using the process according to the invention.

The gates were adjusted to a 0.010 inch variance in less than four working hours, all in one adjustment.

| GATES | UNIT #3 GATE CLEARANCES | | |
|---|---|---|---|
| | ORIGINAL READINGS | FINAL AFTER PROGRAMMED ADJUSTMENT | AFTER SWINGING GATES |
| A-B | 0.102 | 0.113 | 0.027 |
| B-C | 0.080 | 0.114 | 0.034 |
| C-D | 0.123 | 0.114 | 0.018 |
| D-E | 0.186 | 0.114 | 0.018 |
| E-F | 0.048 | 0.104 | 0.012 |
| F-G | 0.083 | 0.110 | 0.006 |
| G-H | 0.127 | 0.107 | 0.008 |
| H-I | 0.100 | 0.114 | 0.015 |
| I-J | 0.032 | 0.114 | 0.021 |
| J-K | 0.141 | 0.114 | 0.025 |
| K-L | 0.116 | 0.112 | 0.031 |
| L-M | 0.085 | 0.114 | 0.039 |
| M-N | 0.246 | 0.112 | 0.024 |
| N-O | 0.192 | 0.114 | 0.033 |
| O-P | 0.141 | 0.114 | 0.035 |
| P-Q | 0.099 | 0.114 | 0.040 |
| Q-R | 0.193 | 0.114 | 0.022 |
| R-S | 0.273 | 0.1135 | 0.024 |
| S-T | 0.223 | 0.114 | 0.024 |
| T-A | 0.105 | 0.114 | 0.032 |
| MAXIMUM VARIANCE = 0.010 | | | |

This unit originally had two gates with extra eccentric pins which were retained due to the Unit #5 experience. Ironically, this time the program results indicated that both were unnecessary.

With the exception of F-gate, all gate face-to-face readings fell well within the manufacturer's original tolerance of 0.003 to 0.006 for a new unit.

Comparisons of Unit #5 and #3 results confirm the analytical analysis, as the range of initial gate readings grows, the resulting computational accuracy diminishes. Unit #5's range was 0.032 to 0.648 inches, while Unit #3's as 0.032 to 0.273 inches. The maximum range for good accuracy appears to be around 0.300 inches.

EXAMPLE 3

UNIT #4 GATE CLEARANCES

| GATES | ORIGINAL READINGS | FINAL AFTER PROGRAMMED ADJUSTMENT | AFTER SWINGING GATES |
|---|---|---|---|
| A-B | 0.219 | 0.111 | 0.028 |
| B-C | 0.190 | 0.110 | 0.033 |
| C-D | 0.217 | 0.110 | 0.040 |
| D-E | 0.051 | 0.113 | 0.029 |
| E-F | 0.016 | 0.103 | 0.019 |
| F-G | 0.067 | 0.111 | 0.030 |
| G-H | 0.019 | 0.107 | 0.016 |
| H-I | 0.042 | 0.110 | 0.020 |
| I-J | 0.008 | 0.105 | 0.020 |
| J-K | 0.114 | 0.110 | 0.029 |
| K-L | 0.083 | 0.110 | 0.040 |
| L-M | 0.020 | 0.110 | 0.034 |
| M-N | 0.005 | 0.110 | 0.031 |
| N-O | 0.172 | 0.112 | 0.031 |
| O-P | 0.250 | 0.111 | 0.026 |
| P-Q | 0.117 | 0.110 | 0.044 |
| Q-R | 0.077 | 0.113 | 0.050 |
| R-S | 0.034 | 0.110 | 0.036 |
| S-T | 0.100 | 0.107 | 0.027 |
| T-A | 0.251 | 0.110 | 0.025 |
| MAXIMUM VARIANCE = 0.010 | | | |

EXAMPLE 4

UNIT #6 GATE CLEARANCES

| GATES | ORIGINAL READINGS | FINAL AFTER PROGRAMMED ADJUSTMENT | AFTER SWINGING GATES |
|---|---|---|---|
| A-B | 0.102 | 0.124 | 0.029 |
| B-C | 0.080 | 0.121 | 0.025 |
| C-D | 0.123 | 0.117 | 0.020 |
| D-E | 0.186 | 0.120 | 0.020 |
| E-F | 0.048 | 0.125 | 0.031 |
| F-G | 0.083 | 0.121 | 0.031 |
| G-H | 0.127 | 0.122 | 0.032 |
| H-I | 0.100 | 0.120 | 0.032 |
| I-J | 0.032 | 0.113 | 0.020 |
| J-K | 0.141 | 0.121 | 0.034 |
| K-L | 0.116 | 0.120 | 0.034 |
| L-M | 0.085 | 0.120 | 0.038 |
| M-N | 0.246 | 0.117 | 0.027 |
| N-O | 0.192 | 0.120 | 0.025 |
| O-P | 0.141 | 0.119 | 0.024 |
| P-Q | 0.099 | 0.120 | 0.027 |
| Q-R | 0.193 | 0.116 | 0.022 |
| R-S | 0.273 | 0.120 | 0.029 |
| S-T | 0.223 | 0.113 | 0.026 |
| T-A | 0.105 | 0.122 | 0.032 |
| MAXIMUM VARIANCE = 0.012 | | | |

EXAMPLE 3

UNIT #1 GATE CLEARANCES

| GATES | ORIGINAL READINGS | AFTER FAILED ADJUSTM. | AFTER SECOND ADJUSTM. | AFTER SWINGING GATES |
|---|---|---|---|---|
| A-B | 0.017 | 0.254 | 0.229 | 0.029 |
| B-C | 0.108 | 0.248 | 0.229 | 0.024 |
| C-D | 0.298 | 0.204 | 0.229 | 0.017 |
| D-E | 0.196 | 0.204 | 0.229 | 0.011 |
| E-F | 0.141 | 0.228 | 0.229 | 0 014 |
| F-G | 0.052 | 0.214 | 0.229 | 0.018 |
| G-H | 0.121 | 0.222 | 0.228 | 0.015 |
| H-I | 0.170 | 0.220 | 0.229 | 0.007 |
| I-J | 0.266 | 0.182 | 0.233 | 0.002 |
| J-K | 0.166 | 0.224 | 0.229 | 0.002 |
| K-L | 0.105 | 0.252 | 0.234 | 0.014 |
| L-M | 0.278 | 0.231 | 0.229 | 0.016 |
| M-N | 0.382 | 0.249 | 0.228 | 0.008 |
| N-O | 0.171 | 0.245 | 0.230 | 0.010 |
| O-P | 0.185 | 0.246 | 0.231 | 0.015 |
| P-Q | 0.190 | 0.240 | 0.229 | 0.015 |
| Q-R | 0.156 | 0.226 | 0.231 | 0.030 |
| R-S | 0.096 | 0.204 | 0.229 | 0.025 |
| S-T | 0.096 | 0.218 | 0.228 | 0.018 |
| T-A | 0.104 | 0.204 | 0.229 | 0.023 |
| MAXIMUM VARIANCE = 0.006 | | | | |

On Unit #1 the servo motors were not properly deactivated and the gates were moving during adjustment. Rather than start over, the resulting readings were used to initiate a second adjustment. The process worked successfully and was proven to be effective with a minimum gate opening of 0.182.

The present invention saves considerable time. Previously, the trial-and-error method was taking as long as four days. Unit #3 was adjusted in less than four working hours.

Final variances were much closer. Formerly, a 0.050 inch variance was accepted. Using the present invention, unit #3 was adjusted to an overall 0.010 inch variance, with the majority of the gates having only a single thousandth's variance. Unit #4 was also adjusted to an overall 0.010 inch variance. Unit #6 was adjusted to an overall variance of 0.012 inch. Unit #1 was adjusted to an overall variance of 0.006 inch.

Gate openings adjusted using the present invention show reasonably repeatable data after gate swings. Gate openings adjusted using known processes provide little repeatability which was incorrectly attributed to gate stem and bushing wear.

While this invention is explained using a specific type of unit and wicket gate and has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method for adjusting a unit of wicket gates comprising the steps of:
   (A) measuring initial gate openings;
   (B) fixing a position of a gate;
   (C) sequentially rotating all other gates to a common selected opening;
   (D) incrementing the common selected opening if the common selected opening is not equal to a final gap between a last rotated gate and the fixed gate;
   (E) repeating step D until the common selected opening is equal to the final gap between the last rotated gate and the fixed gate, the optimum opening for the fixed gate being the common selected opening when the common selected opening is equal to the final gate between the last rotated gate and the fixed gate;
   (F) repeating steps B through E until the optimum opening for each gate has been determined;
   (G) determining an optimum unit opening for the unit; and
   (H) rotating each gate to the optimum unit opening.

2. Method according to claim 1, further comprising the steps of determining an average of initial gate openings, the optimum unit opening being the optimum gate opening closest to the average of the initial gate openings.

3. Method according to claim 1, further comprising the steps of determining an average of initial highest and lowest gate openings, the optimum unit opening being the optimum gate opening closest to the average of the initial highest and lowest gate openings.

4. Method according to claim 1, further comprising the steps of inputting initial openings of all the gates into a computer program which mathematically approximates steps B through F.

5. Method according to claim 1, further comprising the steps of inputting initial openings of all the gates into a computer program which mathematically approximates steps B through F and determines the optimum unit opening.

6. Method according to claim 1, further comprising the steps of inputting initial openings of all the gates into a computer program which mathematically approximates steps B through F, determines the optimum unit opening and stores all of the individual gate rotations needed to adjust from the initial openings to the optimum unit opening.

7. Method according to claim 1, further comprising the steps of rotating each gate to the optimum unit opening in an every-other-gate sequence in two gyrations and inputting initial openings of all the gates into a computer program which mathematically approximates steps B through F, determines the optimum unit opening, and examines a toe and heel clearance of a gate to be adjusted, if the clearance is less than an amount of rotation needed to rotate the gate to an optimum unit opening the gate is skipped, if the clearance is equal to or greater than the amount of rotation needed to rotate the gate to the optimum unit opening the gate is adjusted to the optimum unit opening, all skipped gates are adjusted to the optimum opening on a third gyration.

8. Method according to claim 1, further comprising the steps of inputting initial openings of all the gates into a computer program which mathematically approximates steps B through F, determines the optimum unit opening and determines a maximum positive and maximum negative gate rotation necessary to adjust from the initial gate opening to the final optimum unit opening for all the gates, and equalizes the values of maximum positive and negative gate rotation by equally increasing or decreasing all of the gate openings.

9. Method according to claim 1, further comprising the steps of inputting initial openings of all the gates into a computer program which mathematically approximates steps B through F, determines the optimum unit opening and determines if extra adjustment means are necessary to adjust individual gates to the optimum unit opening.

10. A method for adjusting a unit of wicket gates comprising the steps of:
    (A) measuring initial gate openings;
    (B) determining an optimum unit opening for the unit;
    (C) determining a maximum positive and maximum negative gate rotation necessary to adjust from the initial gate opening to the final optimum unit opening for all the gates;
    (D) equalizing the values of maximum positive and negative gate rotation by equally increasing or decreasing all of the gate openings, prior to rotating the gates to the optimum unit opening; and
    (E) rotating each gate to the optimum unit opening.

11. Method according to claim 10, further comprising the steps of rotating each gate to the optimum unit opening in an every-other-gate sequence.

12. The method according to claim 11, further comprising examining a toe and heel clearance of a gate to be adjusted, if the clearance is less than an amount of rotation needed to rotate the gate to an optimum unit opening the gate is skipped, if the clearance is equal to or greater than the amount of rotation needed to rotate the gate to the optimum unit opening the gate is rotated to the optimum unit opening.

13. Method according to claim 10, further comprising the steps of setting each gate adjustment means to a mid-range position, prior to measuring the initial gate openings.

14. Method according to claim 10, further comprising the steps of synchronously closing the gates until the minimum gate opening is below 50 thousands of an inch, prior to measuring the initial gate openings.

15. Method according to claim 10, further comprising the steps of measuring the initial gate clearances by measuring the minimum clearance between contact surfaces of adjacent gates.

16. Method according to claim 10, further comprising the steps of repeating steps A through C until a desired range of gate openings is obtained.

17. Method according to claim 1, wherein in step (D) the common selected opening is incremented if the common selected opening is not equal within a tolerance of 0.00005 inch to a final gap between a last rotated gate and the fixed gate and in step (E) step D is repeated until the common selected opening is equal within a tolerance of 0.00005 inch to the final gap between the last rotated gate and the fixed gate, the optimum opening for the fixed gate being the common selected opening when the common selected opening is equal within a tolerance of 0.0005 inch to the final gap between the last rotated gate and the fixed gate.

18. A method for adjusting a unit of wicket gates comprising the steps of:

(A) measuring initial gate openings;
(B) determining an optimum unit opening for the unit;
(C) rotating each gate to the optimum unit opening in an every-other-gate sequence while examining a toe and heel clearance of a gate to be adjusted, if the clearance is less than an amount of rotation needed to rotate the gate to an optimum unit opening the gate is skipped, if the clearance is equal to or greater than the amount of rotation needed to rotate the gate to the optimum unit opening the gate is rotated to the optimum unit opening; and
(D) rotating all skipped gates to the optimum unit opening.

* * * * *